(12) United States Patent
Solanki et al.

(10) Patent No.: US 8,160,917 B1
(45) Date of Patent: Apr. 17, 2012

(54) COMPUTER-IMPLEMENTED PROMOTION OPTIMIZATION METHODS AND SYSTEMS

(75) Inventors: Rajendra Singh Solanki, Cary, NC (US); Yinhua Wang, Cary, NC (US); Jie Zhong, San Jose, CA (US)

(73) Assignee: SAS Institute Inc., Cary, NC (US)

( * ) Notice: Subject to any disclaimer, the term of this patent is extended or adjusted under 35 U.S.C. 154(b) by 953 days.

(21) Appl. No.: 12/052,462

(22) Filed: Mar. 20, 2008

Related U.S. Application Data

(60) Provisional application No. 60/923,454, filed on Apr. 13, 2007.

(51) Int. Cl.
*G06Q 10/00* (2012.01)
(52) U.S. Cl. .............. 705/7.31; 705/7.29; 705/7.36; 705/14.13; 705/14.41
(58) Field of Classification Search ............ 705/7.25, 705/7.29, 7.31, 14.13, 14.41, 400, 7.34, 7.35, 705/7.37, 7.36
See application file for complete search history.

(56) References Cited

U.S. PATENT DOCUMENTS

| | | |
|---|---|---|
| 5,195,172 A | 3/1993 | Elad et al. |
| 5,319,781 A | 6/1994 | Syswerda |
| 5,627,973 A | 5/1997 | Armstrong et al. |
| 5,652,842 A | 7/1997 | Siegrist, Jr. et al. |
| 5,712,989 A | 1/1998 | Johnson et al. |
| 5,767,854 A | 6/1998 | Anwar |
| 5,799,286 A | 8/1998 | Morgan et al. |
| 5,867,494 A | 2/1999 | Krishnaswamy et al. |
| 5,926,820 A | 7/1999 | Agrawal et al. |
| 5,946,662 A | 8/1999 | Ettl et al. |
| 5,953,707 A | 9/1999 | Huang et al. |
| 5,963,910 A | 10/1999 | Ulwick |
| 5,999,908 A | 12/1999 | Abelow |
| 6,009,407 A | 12/1999 | Garg |
| 6,014,640 A | 1/2000 | Bent |
| 6,023,684 A | 2/2000 | Pearson |
| 6,029,139 A | 2/2000 | Cunningham et al. |
| 6,041,267 A | 3/2000 | Dangat et al. |
| 6,076,071 A | 6/2000 | Freeny, Jr. |
| 6,078,892 A | 6/2000 | Anderson et al. |
| 6,115,691 A | 9/2000 | Ulwick |
| 6,151,582 A | 11/2000 | Huang et al. |
| 6,175,876 B1 | 1/2001 | Branson et al. |

(Continued)

FOREIGN PATENT DOCUMENTS

EP          1413955          4/2004

(Continued)

OTHER PUBLICATIONS

International Search Report, issued Jun. 22, 2004, for International Application PCT/US03/13394.

(Continued)

*Primary Examiner* — R. David Rines
(74) *Attorney, Agent, or Firm* — Jones Day

(57) ABSTRACT

Computer-implemented systems and methods for determining promotion prices for a plurality of items. A system and method can be configured to receive electronic data about items for a promotion event and to receive electronic data about vehicles for a promotion event. An optimizer, which is implemented on a data processor, includes or has access to an optimization formulation for determining optimal promotion prices for the items and for determining assignments of the vehicles to the items for promoting the items during the promotion event.

19 Claims, 36 Drawing Sheets

U.S. PATENT DOCUMENTS

| | | |
|---|---|---|
| 6,182,060 B1 | 1/2001 | Hedgcock et al. |
| 6,226,623 B1 | 5/2001 | Schein et al. |
| 6,236,977 B1 | 5/2001 | Verba et al. |
| 6,237,138 B1 | 5/2001 | Hameluck et al. |
| 6,249,768 B1 | 6/2001 | Tulskie et al. |
| 6,263,315 B1 | 7/2001 | Talluri |
| 6,275,812 B1 | 8/2001 | Haq et al. |
| 6,286,005 B1 * | 9/2001 | Cannon .................. 455/2.01 |
| 6,321,133 B1 | 11/2001 | Smirnov et al. |
| 6,321,206 B1 | 11/2001 | Honarvar |
| 6,397,224 B1 | 5/2002 | Zubeldia et al. |
| 6,456,999 B1 | 9/2002 | Netz |
| 6,470,344 B1 | 10/2002 | Kothuri et al. |
| 6,484,179 B1 | 11/2002 | Roccaforte |
| 6,502,077 B1 | 12/2002 | Speicher |
| 6,526,526 B1 | 2/2003 | Dong et al. |
| 6,546,135 B1 | 4/2003 | Lin et al. |
| 6,553,352 B2 | 4/2003 | Delurgio et al. |
| 6,560,501 B1 | 5/2003 | Walser et al. |
| 6,581,068 B1 | 6/2003 | Bensoussan et al. |
| 6,584,447 B1 | 6/2003 | Fox et al. |
| 6,611,829 B1 | 8/2003 | Tate et al. |
| 6,640,215 B1 | 10/2003 | Galperin et al. |
| 6,643,659 B1 | 11/2003 | MacIssac et al. |
| 6,728,724 B1 | 4/2004 | Megiddo et al. |
| 6,735,570 B1 | 5/2004 | Lacy et al. |
| 6,750,864 B1 | 6/2004 | Anwar |
| 6,898,603 B1 | 5/2005 | Petculescu et al. |
| 6,901,406 B2 | 5/2005 | Nabe et al. |
| 6,907,382 B2 | 6/2005 | Urokohara |
| 6,970,830 B1 | 11/2005 | Samra et al. |
| 7,039,594 B1 | 5/2006 | Gersting |
| 7,062,447 B1 | 6/2006 | Valentine et al. |
| 7,068,267 B2 | 6/2006 | Meanor et al. |
| 7,085,734 B2 | 8/2006 | Grant et al. |
| 7,089,266 B2 | 8/2006 | Stolte et al. |
| 7,092,896 B2 | 8/2006 | Delurgio et al. |
| 7,092,918 B1 | 8/2006 | Delurgio et al. |
| 7,092,929 B1 | 8/2006 | Dvorak et al. |
| 7,130,811 B1 * | 10/2006 | Delurgio et al. ........... 705/14.43 |
| 7,133,876 B2 | 11/2006 | Roussopoulos et al. |
| 7,133,882 B1 | 11/2006 | Pringle et al. |
| 7,171,376 B2 | 1/2007 | Ramakrishnan |
| 7,236,949 B2 | 6/2007 | Natan et al. |
| 7,240,019 B2 | 7/2007 | Delurgio et al. |
| 7,249,031 B2 | 7/2007 | Close et al. |
| 7,251,615 B2 | 7/2007 | Woo |
| 7,302,400 B2 | 11/2007 | Greenstein |
| 7,302,410 B1 | 11/2007 | Venkatraman et al. |
| 7,310,646 B2 | 12/2007 | Rangadass et al. |
| 7,346,538 B2 | 3/2008 | Reardon |
| 7,370,366 B2 | 5/2008 | Lacan et al. |
| 7,379,890 B2 | 5/2008 | Myr et al. |
| 7,395,255 B2 | 7/2008 | Li |
| 7,440,903 B2 | 10/2008 | Riley et al. |
| 7,505,482 B2 | 3/2009 | Adamczyk et al. |
| 7,519,908 B2 | 4/2009 | Quang et al. |
| 7,536,361 B2 | 5/2009 | Alberti et al. |
| 7,617,119 B1 | 11/2009 | Neal et al. |
| 7,689,456 B2 * | 3/2010 | Schroeder et al. ............ 705/7.31 |
| 7,752,067 B2 | 7/2010 | Fotteler et al. |
| 7,756,945 B1 | 7/2010 | Andreessen et al. |
| 7,798,399 B2 | 9/2010 | Veit |
| 7,877,286 B1 | 1/2011 | Neal et al. |
| 7,895,067 B2 | 2/2011 | Ramakrishnan |
| 2002/0013757 A1 | 1/2002 | Bykowsky et al. |
| 2002/0046096 A1 | 4/2002 | Srinivasan et al. |
| 2002/0072953 A1 | 6/2002 | Michlowitz et al. |
| 2002/0099678 A1 * | 7/2002 | Albright et al. ................. 706/45 |
| 2002/0107723 A1 | 8/2002 | Benjamin et al. |
| 2002/0116237 A1 | 8/2002 | Cohen et al. |
| 2002/0123930 A1 | 9/2002 | Boyd et al. |
| 2002/0169654 A1 | 11/2002 | Santos et al. |
| 2002/0169655 A1 | 11/2002 | Beyer et al. |
| 2002/0178049 A1 | 11/2002 | Bye |
| 2003/0023598 A1 | 1/2003 | Janakiraman et al. |
| 2003/0028437 A1 | 2/2003 | Grant et al. |
| 2003/0050845 A1 | 3/2003 | Hoffman et al. |
| 2003/0078830 A1 | 4/2003 | Wagner et al. |
| 2003/0083924 A1 | 5/2003 | Lee et al. |
| 2003/0083925 A1 | 5/2003 | Weaver et al. |
| 2003/0088458 A1 | 5/2003 | Afeyan et al. |
| 2003/0097292 A1 | 5/2003 | Chen et al. |
| 2003/0110072 A1 | 6/2003 | Delurgio et al. |
| 2003/0110080 A1 | 6/2003 | Tsutani et al. |
| 2003/0120584 A1 | 6/2003 | Zarefoss et al. |
| 2003/0126010 A1 | 7/2003 | Barns-Slavin |
| 2003/0126136 A1 | 7/2003 | Omoigui |
| 2003/0167098 A1 | 9/2003 | Walser et al. |
| 2003/0172145 A1 | 9/2003 | Nguyen |
| 2003/0208402 A1 | 11/2003 | Bibelnieks et al. |
| 2003/0208420 A1 | 11/2003 | Kansal |
| 2003/0220830 A1 * | 11/2003 | Myr .............................. 705/10 |
| 2003/0229502 A1 | 12/2003 | Woo |
| 2003/0236721 A1 | 12/2003 | Plumer et al. |
| 2004/0093296 A1 | 5/2004 | Phelan et al. |
| 2004/0103051 A1 | 5/2004 | Reed et al. |
| 2004/0111388 A1 | 6/2004 | Boiscuvier et al. |
| 2004/0111698 A1 | 6/2004 | Soong et al. |
| 2004/0199781 A1 | 10/2004 | Erickson et al. |
| 2005/0033761 A1 | 2/2005 | Guttman et al. |
| 2005/0066277 A1 | 3/2005 | Leah et al. |
| 2005/0096963 A1 * | 5/2005 | Myr et al. ....................... 705/10 |
| 2005/0197896 A1 | 9/2005 | Viet et al. |
| 2005/0198121 A1 | 9/2005 | Daniels et al. |
| 2005/0256726 A1 | 11/2005 | Benson et al. |
| 2005/0256753 A1 | 11/2005 | Veit et al. |
| 2005/0262108 A1 | 11/2005 | Gupta |
| 2005/0267901 A1 | 12/2005 | Irlen |
| 2005/0289000 A1 | 12/2005 | Chiang et al. |
| 2006/0047608 A1 | 3/2006 | Davis et al. |
| 2006/0069598 A1 | 3/2006 | Schweitzer et al. |
| 2006/0074728 A1 | 4/2006 | Schweitzer et al. |
| 2006/0143030 A1 | 6/2006 | Wertheimer |
| 2006/0248010 A1 | 11/2006 | Krishnamoorthy et al. |
| 2007/0055482 A1 | 3/2007 | Goodermote et al. |
| 2007/0100981 A1 | 5/2007 | Adamczyk et al. |
| 2007/0174119 A1 | 7/2007 | Ramsey et al. |
| 2007/0223462 A1 | 9/2007 | Hite et al. |
| 2007/0288296 A1 | 12/2007 | Lewis |
| 2008/0077459 A1 | 3/2008 | Desai et al. |
| 2008/0140581 A1 | 6/2008 | Mayer |
| 2008/0140688 A1 | 6/2008 | Clayton et al. |
| 2008/0208678 A1 | 8/2008 | Walser et al. |
| 2008/0208719 A1 | 8/2008 | Sharma et al. |
| 2009/0271241 A1 | 10/2009 | Pratt |

FOREIGN PATENT DOCUMENTS

| | | |
|---|---|---|
| WO | WO 01/11522 | 2/2001 |
| WO | 2007/002841 | 1/2007 |

OTHER PUBLICATIONS

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.gl.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, retrieved from Dialog, file 16.

Saarenvirta, Data Mining to Improve Profitability, CMA Magazine, vol. 72, No. 2, Mar. 1998, pp. 8-12.
Johnson et al, Recent Developments and Future Directions in Mathematical Programming, IBM Systems Journal, vol. 31, No. 1, 1992, p. 79-93.
Balintfy et al, Binary and Chain Comparisons with an Experimental Linear Programming Food Price Index, The Review of Economics and Statistics, vol. 52, No. 3, Aug. 1970, pp. 324-330.
Manchanda et al, The "Shopping Basket"; A Model for Multi-Category Purchase Incidence Decisions, Marketing Science, vol. 18, No. 2, 1999, pp. 95-114.
Data Mining News, Looking Past Automation, MarketSwitch Focuses on Optimization of Marketing Campaigns, Data Mining News, May 10, 1999.
Porter-Kuchay, Multidimensional Marketing, Target Marketing, Jan. 2000.
Spiegelman, Optimizers Assist in Specialized marketing Efforts, Computer Reseller News, Nov. 22, 1999.
Horngren, Charles T. et al., "Cost Accounting A Managerial Emphasis", Tenth Edition, Chapter 14, pp. 497-534, 2000.
"Advances in Mathematical Programming and Optimization in the SAS System" by Kearney, SAS Institute, SUGI Proceedings, 1999.
"SAS/OR Optimization Procedures, with Applications to the Oil Industry" by Cohen et al, SAS Institute, SUGI Proceedings, 1994.
"Supply chain design and analysis: models and methods" by Beamon, International Journal of Production Economics, 1998.
"An effective supplier development methodology for enhancing supply chain performance" by Lee et al, ICMIT, 2000.
"Perfect and Open Ratings Form Alliance to Provide Critical Supplier Performance Ratings to Private Exchanges and Net Markets", Business Wire, Oct. 30, 2000.
"12 Technologies: i2 releases i2 five.two-the complete platform for dynamic value chain management; flexible, intuitive, powerful solutions designed to help companies gain efficiencies and drive revenue", M2 Presswire, Oct. 25, 2001.
"Simulation Optimization Using Soft Computing" by Andres Medaglia, PhD dissertation for Operations Research Department at North Carolina State University, Jan. 24, 2001.
"Supplier Selection and Management system Considering Relationships in Supply Chain Management" by Lee et al, IEEE Transactions on Engineering Management, Aug. 2001.
"Solver setting for optimal solutions" by Ananda Samudhram, New Straits Times, Nov. 22, 1999.
"Evaluating Suppliers of Complex Systems: A multiple criteria approach" by Cook et al, The Journal of the Operational Research Society, Nov. 1992.
Armstrong, Mark, "Multiproduct Nonlinear Pricing", Econometrica, vol. 64, No. 1, pp. 51-75 (Jan. 1996).
Armstrong, Ronald D. et al., The Multiple-Choice Nested Knapsack Model, Management Science, vol. 28, No. 1, pp. 34-43 (Jan. 1982).
Chettri, Inderlal Singh et al., "Pre Pack Optimization: Increasing Supply Chain Efficiency", Cognizant Technology Solutions, pp. 1-26 (undated).
Haupt, J, "Enterprise Wide Data Warehousing with SAP BW," SAP AG, pp. 1-38 (2004).
Howard, Philip, "Data Warehousing with SAS," Bloor Research, pp. 1-13 (2005).
Kelley, Dave, "Merchandise Intelligence: Predictive insights improve bottom line," RIS News, p. 32 (Mar. 2006).
McDonald, Kevin et al., "Mastering the SAP® Business Information Warehouse," Wiley Publishing, Inc., pp. 1-18, 35-88, and 279-332 (Sep. 2002).
Pisinger, David, "A Minimal Algorithm for the Multiple-Choise Knapsack Problem", Technical Report 94/25, DIKU, University of Copenhagen, Denmark, pp. 1-23 (May 1984).
Ramirez, Ariel Ortiz, "three-Tier Architecture," Linux Journal, downloaded from http://www.linuxjournal.com/article/3508, 4 pp. (Jul. 1, 2000).
Renaud, Jacques et al., "A heuristic for the pickup and delivery traveling salesman problem," Computers & Operations Research, 27, pp. 905-916 (2000).
Schindler, Robert M. et al., "Increased Consumer Sales Response Though Use of 99-Ending Prices," Journal of Retailing, vol. 72(2), pp. 187-199, ISSN: 0022-4359 (1996).
Smith, Michael John Sebastian, "Application-Specific Integrated Circuits," Addison-Wesley Longman, Inc., Chapter 1: Introduction to ASICS, cover page and pp. 20-34.
White, John W., "Making ERP Work the Way Your Business Works," Fuego, ERP White Paper, pp. 1-8 (2002).
"i2 Technologies: i2 releases i2 five.two-the complete platform for dynamic value chain management; flexible, intuitive, powerful solutions designed to help companies gain efficiencies and drive revenue", M2 Presswire (Oct. 25, 2001).
i2 Technologies, Inc., "Improving Service and Market Share with i2 Inventory Optimization: How superior inventory management can be deployed as a competitive weapon to drive the top and the bottom line", pp. 1-26 (Aug. 2004).
Microsoft, MSDN, Chapter 5: Layered Application Guidelines, downloaded from http://msdn.microsoft.com/en-us/library/ee658109(d=printer).aspx (10 pp.).
Microsoft, MSDN, Three-Layered Services Application, downloaded from http://msdn.microsoft.com/en-us/library/ff648105(d=printer).aspx (6 pp.).
Data Model definition from Wikipedia (18 pp.).
Enterprise Application Integration definition from Wikipedia (7 pp.).
Enterprise Information Integration definition from Wikipedia (3 pp.).
Multitier Architecture definition from Wikipedia (4 pp.).
Service-Oriented Architecture definition from Wikipedia (19 pp.).
Software as a Service definition from Wikipedia (7 pp.).

* cited by examiner

800

Vehicle Details

| | |
|---|---|
| Name: | Coupon_1 |
| Category: | The COUPON vehicle |
| Start Date: | 04/02/2006 |
| End Date: | 04/08/2006 |
| Due Date: | 03/19/2006 |
| Impact Start Date | 04/02/2006 |
| Impact End Date | 04/08/2006 |
| Number of spots: | 0 |

Products: 1,434
Locations: 61

☐ Price promotion required
☐ Price by Zone

Breakdown of spots across scope:

Vehicle Attributes:

| | |
|---|---|
| Circulation | 0 |
| Distribution method | store |
| Effective Discount | 15.00 |
| Number distributed | 0 |

[ Save ]  [ Cancel ]  [ Help ]

| New Plan | ☒ |

Plan Details

Name: `Plan_1`

Description: `_____`

Lowest decision level: `Style ▼`

Start Date: `04/02/2006` 🗓

End Date: `04/08/2006` 🗓

☐ Price by zone

Scope

Products: 1,434          Locations: 61

Notes

`_____`

[ Save ]  [ Cancel ]  [ Help ]

Fig. 10

☐ Merchandise Intelligence
File  Edit  View  Tools  Window  Help

| Promotion Calendars | Calendar Chart View | Calendar_1 | Event_1 | Plan_2 ✗ |

Status:              Active
Event Name:          Event_1
Calendar Name:       Calendar_1
Lowest decision level: Style
  Notes ┌─Dates─────────────────────┐
│ Start date: 09/26/2005    │
│ End date:   10/02/2005    │
│                           │
│ Products:  19,868         │
│ Locations: 61             │
└───────────────────────────┘

┌─Optimization/Evaluation ─────────── 1302
│ ⊘ Status:      Optimized
│   Goal:        [Maximize Margin ($)]
│   Target:      [Revenue ($)]
│   Target Value:            300000
│   Message:     Optimized
└──────────────────────────────────

| Plan Performance | Messages |

▽ Plan Performance

|                  | Revenue ($)   | Margin ($)     |
|------------------|---------------|----------------|
| Plan Expected    | 38,745,421.51 | (1,825,950.41) |
| Baseline Expected| 35,605,631.35 | (2,403,229.87) |
| Change           | 8.82 %        | (24.02)%       |

▽ Product assignments

| Level △ | SKU      | Description      | Current Cost ($) | Cost Change | Cost Type | New Cost ($) |
|---------|----------|------------------|------------------|-------------|-----------|--------------|
| Style   | 86243560 | POLO MEMORY...   | 4.55             |             | -%        | 4.55         |
| Style   | 87899536 | JNY BASEBALL...  | 3.50             |             | -%        | 3.50         |
| Style   | 87685934 | GIANNA 76761...  | 10.36            |             | -%        | 10.36        |
| Style   | 87809906 | JNY SL LS JRSY...| 4.31             |             | -%        | 4.31         |
| Style   | 87809902 | NAUTICA SL JE... | 4.88             |             | -%        | 4.88         |
| Style   | 87685841 | GUESS 76757      | 10.36            |             | -%        | 10.36        |
| Style   | 87685654 | GIANNA RHINE...  | 1.50             |             | -%        | 1.50         |
| Style   | 86928831 | GUESS LOGO H...  | 14.25            |             | -%        | 14.25        |
| Style   | 87767398 | R + B SPORT S... | 7.50             |             | -%        | 7.50         |
| Style   | 87767376 | GODINGER GIR...  | 7.50             |             | -%        | 7.50         |
| Style   | 87767350 | POLO SCRAPB...   | 7.50             |             | -%        | 7.50         |
| Style   | 87767306 | GODINGER BRI...  | 5.10             |             | -%        | 5.10         |
| Style   | 87767226 | GODINGER VIN...  | 5.10             |             | -%        | 5.10         |

▽ Calendar Vehicle Assignments

| Level △ | SKU | Description |   |
|---------|-----|-------------|---|
|         |     |             |   |

MATCH TO FIG. 14B

| Merchandise Intelligence | | | | | |
|---|---|---|---|---|---|
| File Edit View Tools Window Help | | | | | |

Promotion Calendars | Calendar Chart View | Calendar_1 | Event_1 | Plan_2 ✕

Status: Active
Event Name: Event_1
Calendar Name: Calendar_1
Lowest decision level: Style
Notes ─ Dates ─
Start date: 09/26/2005
End date: 10/02/2005

Products: 19,868
Locations: 61

─ Optimization/Evaluation ─
⊘ Status: Optimized
Goal: Maximize Margin ($)
Target: Revenue ($)
Target Value: 300000
Message: Optimized

Plan Performance | Messages

▽ Plan Performance

|  | Revenue ($) | Margin ($) |
|---|---|---|
| Plan Expected | 36,731,269.15 | (2,104,896.81) |
| Baseline Expected | 35,605,631.35 | (2,403,229.87) |
| Change | 3.16% | (12.41)% |

▽ Product assignments

| Level △ | SKU | Description | Current Cost ($) | Cost Change | Cost Type | New Cost ($) |
|---|---|---|---|---|---|---|
| Style | 86243560 | POLO MEMORY... | 4.55 | | -% | 4.55 |
| Style | 87899536 | JNY BASEBALL... | 3.50 | | -% | 3.50 |
| Style | 87685934 | GIANNA 76761... | 10.36 | | -% | 10.36 |
| Style | 87809906 | JNY SL LS JRSY... | 4.31 | | -% | 4.31 |
| Style | 87809902 | NAUTICA SL JE... | 4.88 | | -% | 4.88 |
| Style | 87685841 | GUESS 76757 | 10.36 | | -% | 10.36 |
| Style | 86241299 | LENOX REGAL B... | 6.01 | | -% | 6.01 |
| Style | 87685654 | GIANNA RHINE... | 1.50 | | -% | 1.50 |
| Style | 86928831 | GUESS LOGO H... | 14.25 | | -% | 14.25 |
| Style | 87767398 | R + B SPORT S... | 7.50 | | -% | 7.50 |
| Style | 87767376 | GODINGER GIR... | 7.50 | | -% | 7.50 |
| Style | 87767350 | POLO SCRAPB... | 7.50 | | -% | 7.50 |
| Style | 87767306 | GODINGER BRI... | 5.10 | | -% | 5.10 |

MATCH TO FIG. 15B

▽ Calendar Vehicle Assignments

| Level △ | SKU | Description | | |
|---|---|---|---|---|
| | | | | |
| | | | | |
| | | | | |
| | | | | |
| | | | | |
| | | | | |

Date 03/22/2007 9:38 AM
Maximum Percent Discount: 30.00 % ◄—— 1402
Minimum Percent Discount: 0.00 %
☐ Allow promoted price to vary by Price Zones
☐ Constrain optimization by inventory
                                              ╭— 1404

| Margin (%) | Sales Units |
|---|---|
| (5.73) | 6,525,096.0 |
| (6.74) | 6,387,856.0 |
| 1.01 | 2.15 % |

1406

Show: All Columns

| Regular Price ($) | Sales Target | Quantity | Promotion Amount(... | Promotion Type | Final Price ($/Un |
|---|---|---|---|---|---|
| 14.99 | | 1 | ☑ 10.000 | -% | 13. |
| 15.00 | | 1 | ☑ 30.000 | -% | 10. |
| 40.00 | | 1 | ☑ 30.000 | -% | 28. |
| 14.00 | | 1 | ☑ 10.000 | -% | 12. |
| 16.00 | | 1 | ☑ 10.000 | -% | 14. |
| 40.00 | | 1 | ☑ 30.000 | -% | 28. |
| 19.99 | | 1 | ☑ 10.000 | -% | 17. |
| 5.50 | | 1 | ☑ 20.000 | -% | 4. |
| 46.00 | | 1 | ☑ 10.000 | -% | 41. |
| 24.99 | | 1 | ☑ 10.000 | -% | 22. |
| 24.99 | | 1 | ☑ 10.000 | -% | 22. |
| 24.99 | | 1 | ☑ 10.000 | -% | 22. |
| 16.99 | | 1 | ☑ 10.000 | -% | 15. |

MATCH TO FIG. 15A

| New Event | ☒ |

Event Details

Name: Early June

Description: Summer kick-off event

Event Number: 101

Type: PROMOTION

Start Date: 06/05/2005

End Date: 06/11/2005

Scope

Products: 4,391    Locations: 23

Notes

[ Save ]  [ Cancel ]  [ Help ]

New Plan                                            ☒

Plan Details
  Name:                    Holiday Event plan
  Description:             [                    ]
  Lowest decision level:   SKU          ▽
  Start Date:              05/28/2010   ▦
  End Date:                06/03/2010   ▦
  ☑ Price by zone Scope
  Products: 27,360        Locations: 1,883

Notes
  [                                          ]

Save    Cancel    Help

| Promotion Calendars | Calendar_1 | Event_1 | Event_2 | Plan_3 ✕ |

Plan Details
Status: Active
Event Name: Event_2
Calendar Name: Calendar_
Lowest decision level: SKU Notes

Dates
Start date: 06/08/2005
End date: 06/15/2005

Scope
Products: 31
Locations: 62

Optimization/Eva
○ Status:
Goal:
Target:
Target Value:
ⓘ Message:

| Plan Performance | Optimization/Evaluation Messages |

▽ Plan Performance

|  | Revenue ($) | Margin (%) |
|---|---|---|
| Plan Expected | 26,698.99 |  |
| Baseline Expected | 24,600.89 |  |
| Change | 9.000 % |  |

▽ Product Assignments

| △ Level | SKU | Description | SKU Description |
|---|---|---|---|
| SKU | 70015021 | SKU BASIC FR... | 70015021-SKU |
| SKU | 70018308 | SKU BASIC FR... | 70018308-SKU |
| SKU | 70014308 | SKU BASIC FR... | 70014308-SKU |
| SubClass | 6000129 | MISCELLANEO... | 6000129-MISCE... |
| SubClass | 6000128 | 9X7 | 6000128-9X7 |

MATCH TO FIG. 20B

Fig. 20A

MATCH TO FIG. 20A

1900

Menu ▼ | 💾 | Optimize Evaluate luation
Unevaluated | Date | 10/10/2005
[Maximize Revenue ($) ▼] | Maximum Percent Discount: [100.00] %
[Gross Margin ($) ▼] | Minimum Percent Discount: [0.00] %
[0.00] | ☐ Allow promoted price to vary by Price Zone
Results are out of date | ☐ Constrain optimization by inventory

| | Margin (%) | Sales Units |
|---|---|---|
| 14,584.63 | 54,210 | 725 |
| 16,516.59 | 67,130 | 483 |
| (12.000) % | (13.000) | 52.000 % |

| Current Cost ($) | Cost Change | Cost Type | New Cost ($) | Reg |
|---|---|---|---|---|
| 18.50 | 20.00 | -% | 14.80 | |
| 18.50 | 5.00 | -% | 17.58 | |
| 18.50 | | -% | 18.50 | |
| 1.57 - 11.25 | | -% | 1.57 - 11.25 | |
| 1.80 - 43.50 | | -% | 1.80 - 43.50 | |

| Plan Details | ☒ |
|---|---|

Plan Details

Name: Plan 1 (Holiday Event)

Description:

Lowest decision level: SKU ▽

Start Date: 12/11/2006 🗓

End Date: 12/17/2006 🗓

☐ Price by zone

Scope

Products: 37,850          Locations: 1,883

Notes

Plan 1
Goal - Maximize Revenue

[ Save ]  [ Cancel ]  [ Help ]

| Set Price By Price Zone for BASIC FRAMES | | | | ☒ |
|---|---|---|---|---|
| Level: Class | | | | |
| Description: BASIC FRAMES | Discount Type Across Zones: | | Percent Off (%) ▽ | |
| Regular Price: 3.99 - 129.99 | | | | |

| △ Price Zone | Promotion | Type | Promoted Price ($) | |
|---|---|---|---|---|
| MARKET 1 | | -% | 3.99 - 129.99 | |
| MARKET 2 | | -% | 3.99 - 129.99 | |
| MARKET 3 | | -% | 3.99 - 129.99 | |
| MARKET 4 | | -% | 3.99 - 129.99 | |
| MARKET 5 | | -% | 3.99 - 129.99 | |
| MARKET 6 | | -% | 3.99 - 129.99 | |

[ OK ]  [ Cancel ]  [ Help ]

Plan_3 (Copy)

Name: Similar to Plan 3
Start Date: 06/08/2005
End Date: 06/15/2005
Description:
Notes: A copy of Plan 3_for this event.

*Required fields

Scope
Products: 31
Locations: 62

Lowest promotion decision level
SKU

Optimization settings

| | Minimum | Maximum |
|---|---|---|
| Percent discount | 5.00 % | 75.00 % |

☑ Constrain optimization by inventory

[Save] [Cancel] [Help]

| New Vehicle | ☒ |

| Name: | 25 percent off |
| Category: | The DISCOUNT vehicle |
| Start Date: | 05/09/2005 |
| End Date: | 05/15/2005 |
| Due Date: | 05/08/2005 |
| Impact Start Date | 05/09/2005 |
| Impact End Date | 05/15/2005 |
| Number of spots: | 0 |

Scope
Products: 31
Locations: 62

☐ Price promotion required
☐ Price by Zone

Breakdown of spots across scope:

Vehicle Attributes

Percentage Discount                25

[ Save ]  [ Cancel ]  [ Help ]

Vehicle Details

| | |
|---|---|
| Name: | FSI/CIRCULAR_1 |
| Category: | The FSI/CIRCULAR vehicle |
| Start Date: | 06/08/2005 |
| End Date: | 06/21/2005 |
| * Due Date: | 06/07/2005 |
| * Impact Start Date | 06/08/2005 |
| * Impact End Date | 06/21/2005 |
| Number of spots: | 20 |

* Required fields

Scope
Products: 31  Locations: 62

☑ Price promotion required
☐ Price by Zone

Breakdown of spots across scope

Vehicle Attributes

| | |
|---|---|
| Circulation | 1000 |
| CO-OP/Free Standing | CO-OP |
| Distribution method | mail |
| Number of pages | 1 |

[ Save ] [ Cancel ] [ Help ]

COMPUTER-IMPLEMENTED PROMOTION OPTIMIZATION METHODS AND SYSTEMS

CROSS-REFERENCE TO RELATED APPLICATION

This application claims priority to and the benefit of U.S. Application Ser. No. 60/923,454 (entitled "Computer-Implemented Promotion Optimization Methods and Systems" and filed on Apr. 13, 2007), of which the entire disclosure (including any and all figures) is incorporated herein by reference.

TECHNICAL FIELD

This document relates generally to computer-implemented price analysis systems and more particularly to computer-implemented promotion price analysis systems.

BACKGROUND

Retailers face a difficult task when attempting to establish promotion prices for the products and/or services that they offer. The task involves balancing a seemingly set of opposing factors, such as trying to attain a profitable and rational mix of prices that will generate revenue and profit while temporarily reducing items prices during a promotion. The task is made even more difficult if the retailers are confronted with many products that have to be priced.

SUMMARY

In accordance with the teachings provided herein, systems and methods for operation upon data processing devices are provided for determining promotion prices for a plurality of items. As an example, a system and method can be configured to receive electronic data about items for a promotion event and to receive electronic data about vehicles for a promotion event. An optimizer, which is implemented on a data processor, includes or has access to an optimization formulation for determining optimal promotion prices for the items and for determining assignments of the vehicles to the items for promoting the items during the promotion event. The determined optimal promotional prices and the determined assignments of vehicles to promote the items are provided as output to a user or to another computer program.

As another example, a system and method can be configured to receive electronic data about items for a promotion event and to receive electronic data about vehicles for a promotion event. An optimizer, which is implemented on a data processor, includes or has access to an optimization formulation for determining optimal promotion prices for the items and for determining assignments of the vehicles to the items for promoting the items during the promotion event. The determining of the optimal promotion prices through the optimizer is based upon the effect on an item's own demand and upon cross effects on demands of other items. The optimization formulation includes demand models that relate prices and support vehicle assignments of the items to demands. One or more of the demand models are nonlinear demand models. The optimizer includes local searching instructions and branching scheme instructions. The local searching instructions are configured to determine combinatorial possibilities in arriving at the optimal promotional prices and assignments of the vehicles to the items. The branching scheme instructions are configured to compute incremental changes in performance indexes associated with the assignments of the vehicles to the items. The determined optimal promotional prices and the determined assignments of vehicles to promote the items are provided as output to a user or to another computer program.

BRIEF DESCRIPTION OF THE DRAWINGS

FIGS. 8A-15B illustrate several user interface screens within the context of a price promotion operational scenario.

FIGS. 17-20B and 21-28 illustrate several user interface screens within the context of another price promotion operational scenario.

DETAILED DESCRIPTION

Figure 1:
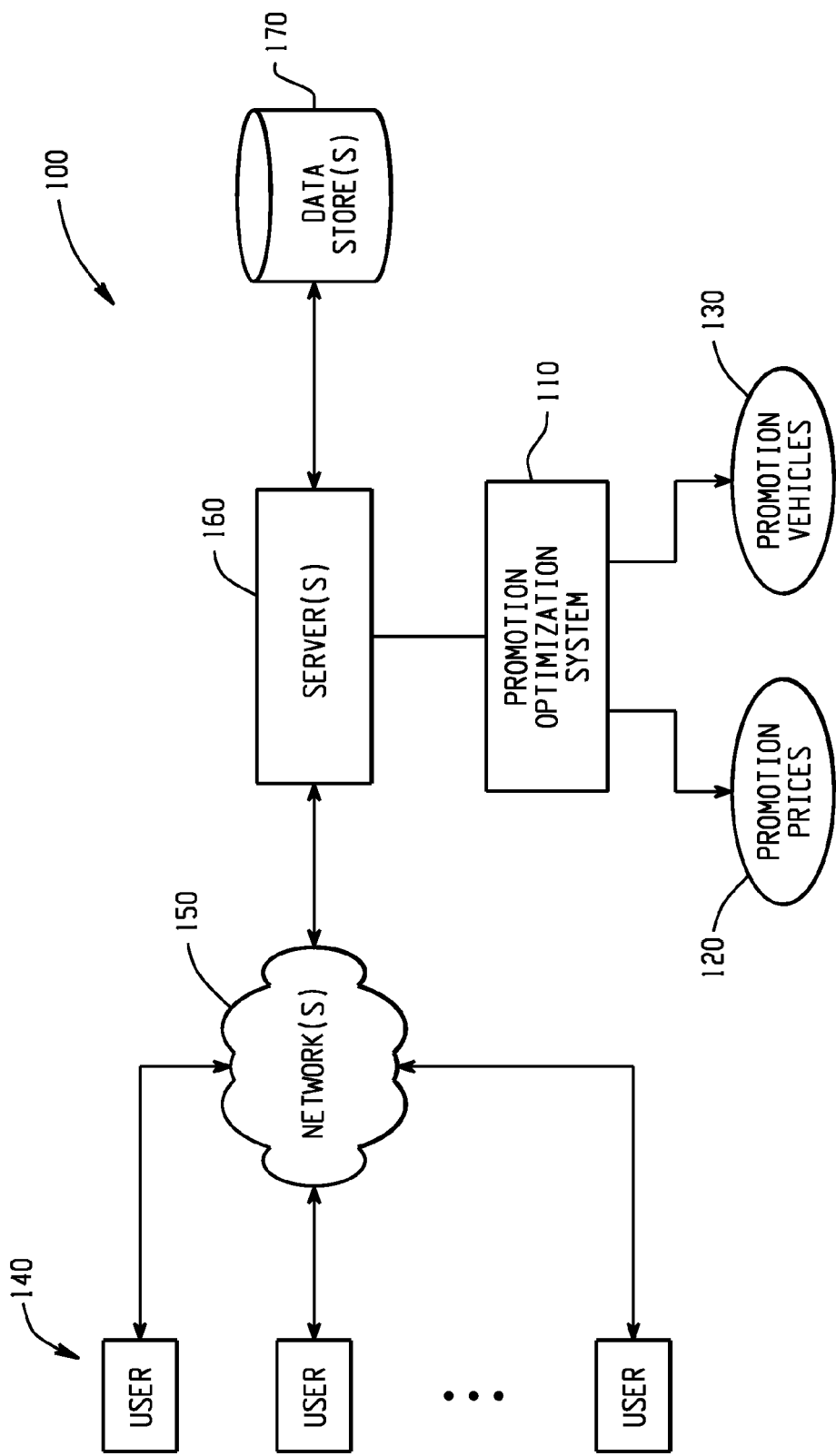
FIG. 1 is a block diagram depicting an environment wherein users can interact with a price promotion optimization system.

FIG. 1 depicts at 100 an environment wherein users 140 can interact with a price promotion optimization system 110 in order to select items to promote during an event. An event is a sales promotion that is executed in one or more locations. A purpose of an event is to cause an increase in demand for a set of items (e.g., goods or products). This is typically accomplished with a temporary reduction in price. In addition, an event is supported with promotional vehicles, such as newspaper circulars or end-of-aisle displays.

A price promotion optimization system 110 works to establish optimal or new optimal temporary reductions in prices 120 for the selected items and also can determine which vehicles 130 should be used to help promote such items. A price promotion optimization system 110 can be involved in many different contexts, such as in dealing with small-sized price promotion optimization problems as well as with complex price promotion situations involving determinations of tens of thousands of prices at thousands of locations or stores for a retailer with a nation-wide presence. As an example, a price promotion optimization system 110 can recommend items to be promoted on different vehicles and their prices by taking into account one or more of the following features in performing its price promotion optimization operations:
- base forecast
- price elasticity
- vehicle lifts and their synergies
- cross-effects between items (within scope)
- number of spots to be recommended on each vehicle
- business rules
- user selections
- objectives: revenue, margin, margin percent Users 140 can interact with the system 110 through a number of ways, such as over one or more networks 150. Server(s) 160 accessible through the network(s) 150 can host the system 110. One or more data stores 170 can store the data to be analyzed by the system 110 as well as any intermediate or final data generated by the system 110.

The system 110 can be an integrated web-based reporting and analysis tool that provides users flexibility and functionality for performing price promotion optimization. It should be understood that a system 110 could also be provided on a stand-alone computer for access by a user.

Figure 2:
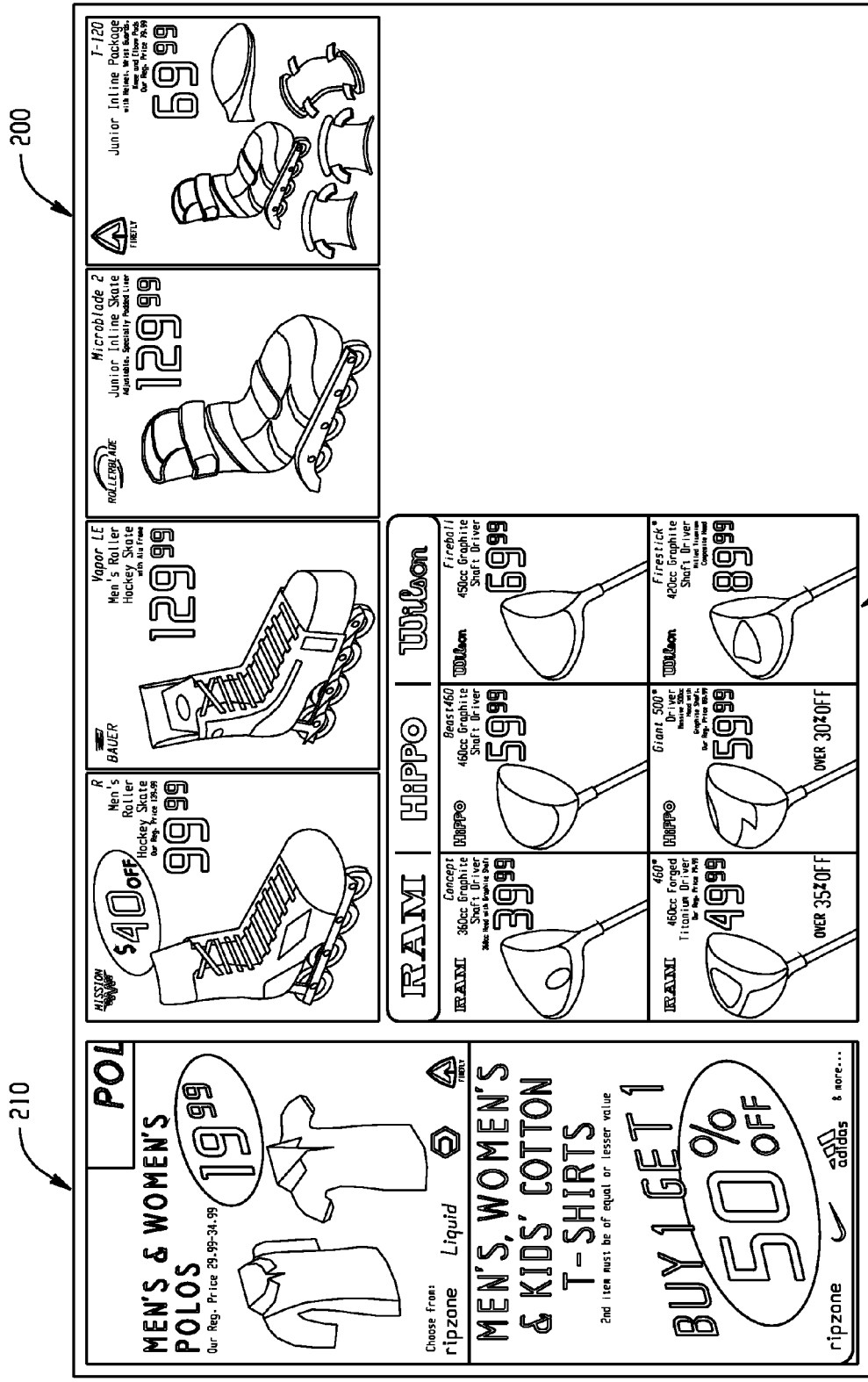
FIG. 2 depicts an illustration of a type of vehicle that can be ultimately generated through use of a price promotion optimization system.

FIG. 2 provides an illustration of a type of vehicle that can be ultimately generated through use of a price promotion optimization system. In the example of FIG. 2, a flyer vehicle is shown at 200 having multiple promotions (e.g., temporary price discounts) for selected items thereon. For example, shirts are being promoted at a discounted price of $19.99 from a regular price of between $29.99 and $34.99. Accordingly, a price promotion optimization system has determined based upon the constraints imposed upon it to offer such shirts at a discounted price of between 33% and 43% from the regular price. Flyer vehicle 200 also shows at 220 another example of a promotion wherein for T-shirts a customer can buy-one-get-one (BOGO) at a reduced rate (i.e., 50%). Still another example at 230 shows different promotion discounts for a variety of golf club products.

Figure 3:
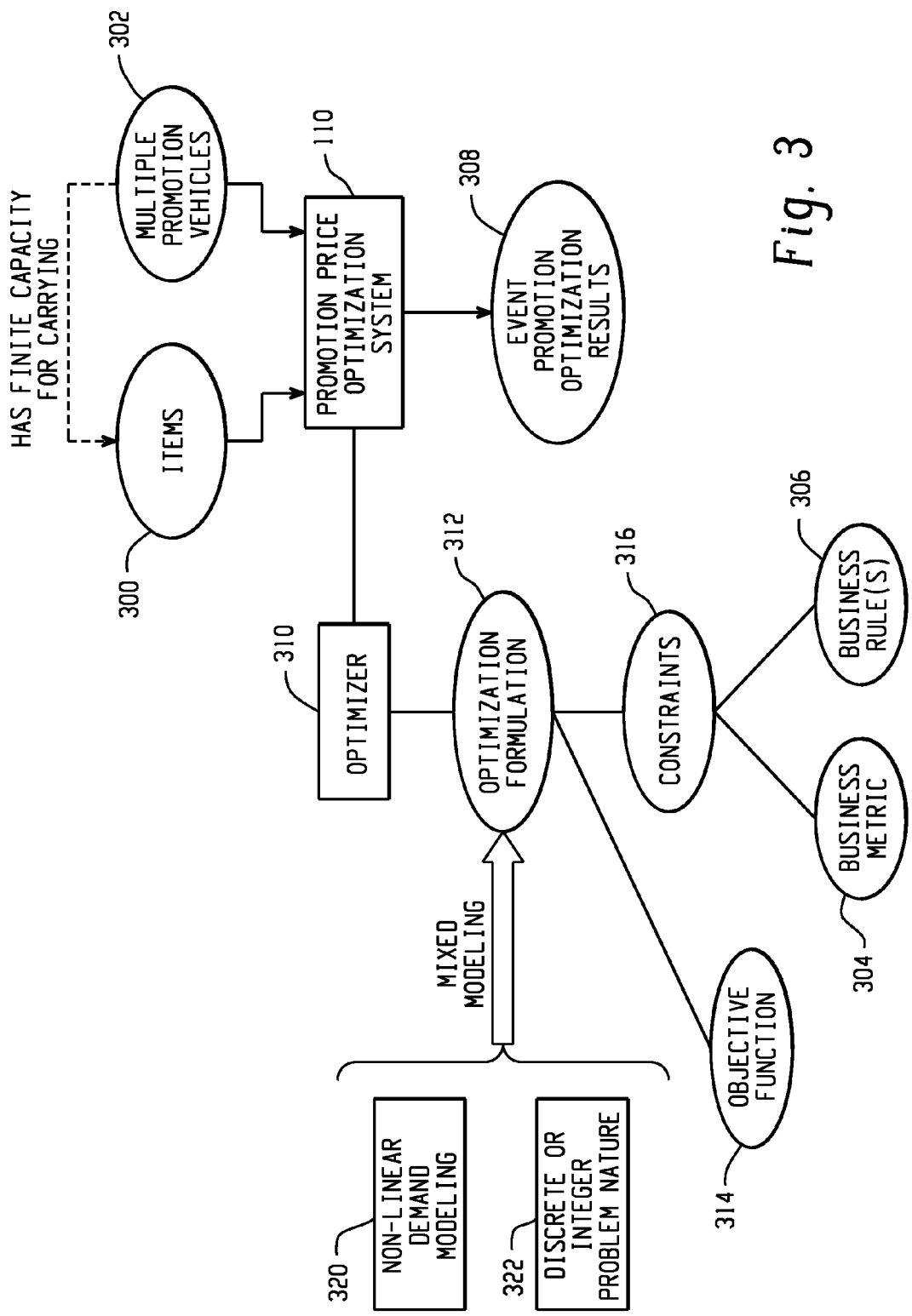
FIGS. 3-5 are block diagrams depicting various computer-based components for a promotion optimization system for selecting items to promote during an event.

FIG. 3 illustrates various computer-based components for a promotion optimization system 110 for selecting items 300 to promote during an event. The selected items 300 can be promoted using a variety of promotion vehicles 302 including price discount. Because promotion vehicles 302 typically have finite capacity, e.g. a flyer can typically accommodate at most about ten items, items 300 are selected such that a chosen business metric 304 is maximized while achieving satisfactory levels of another metric of choice and satisfying a number of business rules 306 related to promotion planning. The selection of an item 300 should be made considering its effect on its own demand as well as the cross effects on the demands of related items. Setting of a promotion price as part of the system results 308 for a selected item 300 involves selection of an optimal promotion price from a number of possible prices belonging to a grid of promotional prices, e.g., a price of an item could be discounted to give 25%, 33%, 50%, or 75% off from the regular price of an item.

The promotion price optimization system 110 includes an optimizer 310 with an optimization formulation 312 that captures the objective 314 and constraints 316 of the business problem. The constraints 316 can be expressed as linear equalities or inequalities. A variety of constraints 316 can guide the results 308 of the system, such as promotion pricing and assignments of items to promotion vehicles:

Promotion vehicles have finite capacity thus only a specified number of items can be assigned to these vehicles.

A group of items can be required to be promoted together, i.e., any promotion decision regarding either price or support vehicles will be uniform for all items in the group. If assigned to a support vehicle, a group consumes only one spot from the capacity of the vehicle.

A group of locations can be required to have uniform promotions over these locations, i.e., price discount will be same for a discounted item over these locations.

A support vehicle can require that any item assigned to the support vehicle should also be discounted using a price vehicle.

A support vehicle can require that an item assigned to the support vehicle should have a uniform price. This constraint assists in ensuring that a support vehicle that advertises price (e.g., a flyer) needs to advertise the same price over all locations.

Promotion prices fall on a grid specified as either percentage discounts or promotion prices, e.g., price of an item could be discounted to give 25%, 33%, 50%, or 75% off from the regular price of an item.

The demand models, relating the prices and support vehicle assignments of items to demands, are nonlinear as indicated at 320. Because of this, arriving at optimal or near-optimal solutions for this problem presents mathematical difficulties given its nonlinear integer nature 320 and the problem-size defined by the number of items and locations involved in a typical promotion planning problem. Moreover, the selection of a price from a price grid and the assignment of an item to a support vehicle lead to a discrete or integer optimization formulation as shown at 322. This results in an optimization formulation 312 that is a nonlinear mixed-integer optimization formulation.

Figure 4:
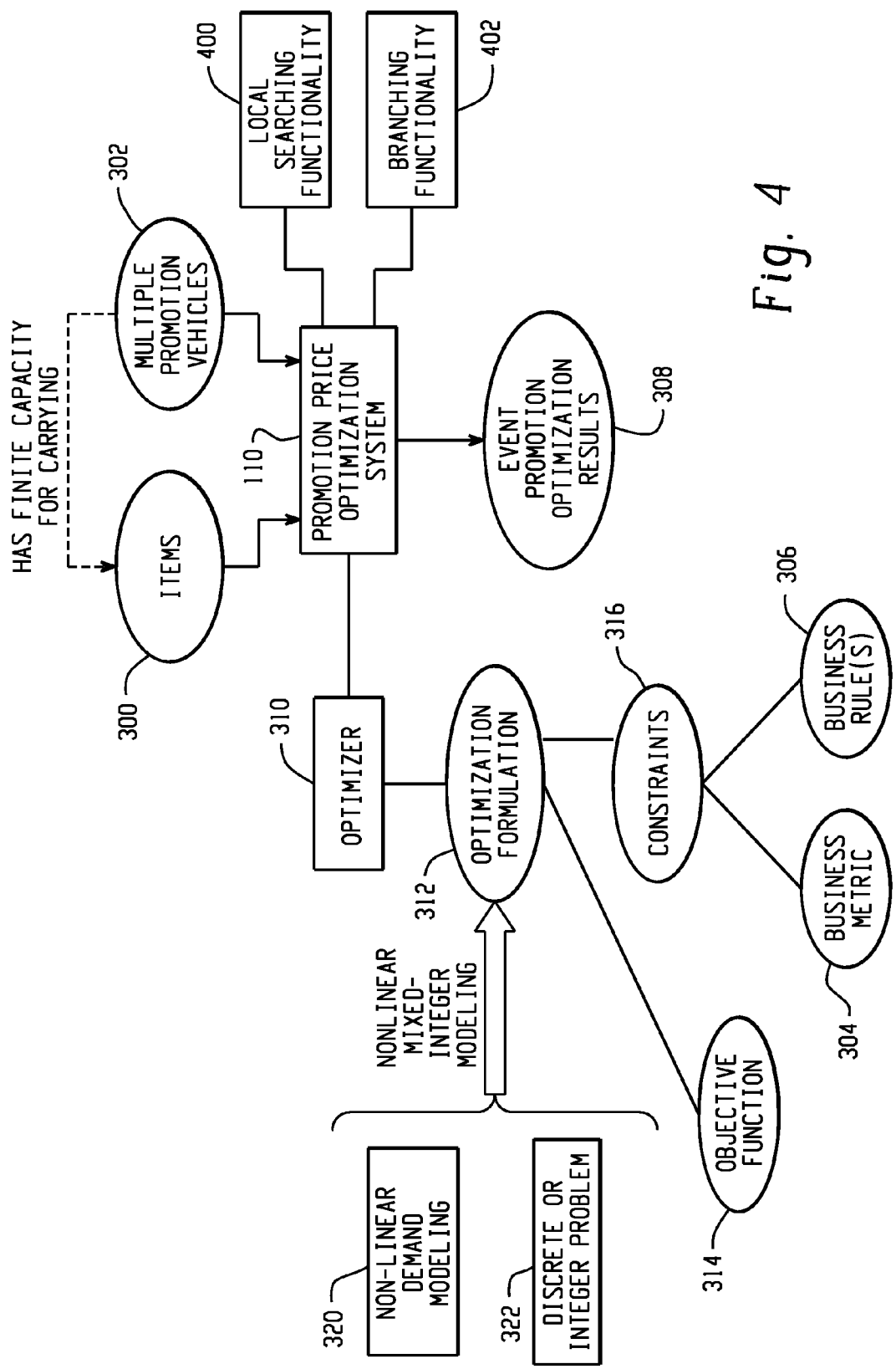

As shown in FIG. 4, a local search algorithm 400 and a branching scheme 402 can be used together for determining the optimal prices and support vehicle assignments. A local search algorithm 400 is configured to explore the combinatorial possibilities in arriving at the optimal prices and the support vehicle assignments. The neighborhood of the local search is defined by the following moves:

Price of an item can be changed to an adjacent grid point. It could be on either side (high or low) of the current price setting.

If capacity allows, then a new item can be added to a support vehicle; otherwise a new item can replace an existing item currently assigned to the support vehicle.

The local search algorithm 400 can account for non-linear effects introduced due to interactions among support vehicles. For example, assigning an item to both vehicles A and B can lead to demand increase higher than the sum of increases by assigning to A or B individually. In such a case, if item 1 is currently assigned to both vehicles A and B, then replacing item 1 by item 2 on only one vehicle can lead to inferior solutions due to the fact that in the revised solution, items 1 and 2 are assigned to one vehicle each. However, replacing item 1 by item 2 on both vehicles may lead to a better solution than the current solution because this solution has item 2 receiving a non-linear demand increase.

A branching scheme 402 is combined with the local search algorithm 400 to ensure that the local search does not get trapped in inferior solutions. In the branching scheme 402, evaluating the quality of a solution requires estimation of demand, revenue, and margin values for the current prices and assignments. Since a very large number of solutions are evaluated in order to arrive at a local-optimal solution, it is useful to be able to evaluate a solution quickly. The algorithm can compute the incremental changes in demand, revenue, and margin over the previous solution.

The optimization formulation 312 of a price promotion optimization system 110 can be mathematically specified in different ways, such as an approach having the mathematical formulation described below that captures the demands of items as a function of price settings and assignments of items to support vehicles. The mathematical formulation described below captures the objective and constraints of a promotion optimization problem. Most of the constraints are expressed as linear equalities or inequalities. The integer optimization is used because the prices of promoted items come from a grid of price points and the assignments of items to support vehicles have to be binary variables. The demand models, relating the prices and promotion supports of items to demands, are nonlinear resulting in a nonlinear mixed-integer optimization formulation.

For the optimization formulation 312, the following notation is used to outline the mathematical formulation and the solution approach:

| | |
|---|---|
| i or j = | index of an item |
| l = | index of a location |
| v = | index of a support vehicle |
| b = | index of vehicle branch consisting of one or more support vehicles such that this combination of vehicles provides a defined support level |
| SB = | A set of vehicle branches where an item can be assigned to at most one branch of the set. Assigning an item to a branch implies that the item is assigned to all vehicles in the branch. |
| $B_v$ = | Set of vehicle branches that contain vehicle v |
| $Cap_v$ = | Capacity of support vehicle v in terms of the maximum number of items that can be assigned to this vehicle |
| $p_i$ = | recommended price of item i during the promotion event. It could be same as the regular price if the item is not selected for price discount. If discounted, then it should belong to the grid of promotion prices. |
| $c_{il}$ = | cost of item i at location l |
| $rp_i$ = | regular price of item i. Regular price denotes the price at which base forecast of item's demand is produced. A recommended price, $p_i$, that is different from the regular price and support vehicle assignments result in modifying the demand of item as determined by the demand model. |
| $f_{il}$ = | base forecast for item i at location l indicating the demand for item i at location l at its regular price, $rp_i$, and no promotion support |
| $d_{il}$ = | demand for item i at location l considering price and support vehicle assignments of i as well as other items that have a cross effect on the demand of i |
| I = | set of items whose prices and support vehicle assignments affect the demand of item i. Set I includes item i as well. |
| G = | set of grid points in price grid indicating promotion prices as percentages of the regular prices of items, i.e. a grid point of 67% implies that the promoted price is 67% of the regular price. |
| $X_{ib}$ = | binary variable representing assignment of item i to branch b of support vehicles where 1 implies that i is assigned to branch b and 0 implies that it is not assigned. |
| $Y_{ig}$ = | binary variable representing promotion price of item i being at point g of promotion grid G. Setting $Y_{ig}$ at 1 implies that $p_i$, the promoted price of item i, has been set at g% of its regular price, $rp_i$. |

Additional notations are used herein when needed in the demand model and the optimization formulation 312.

Figure 5:
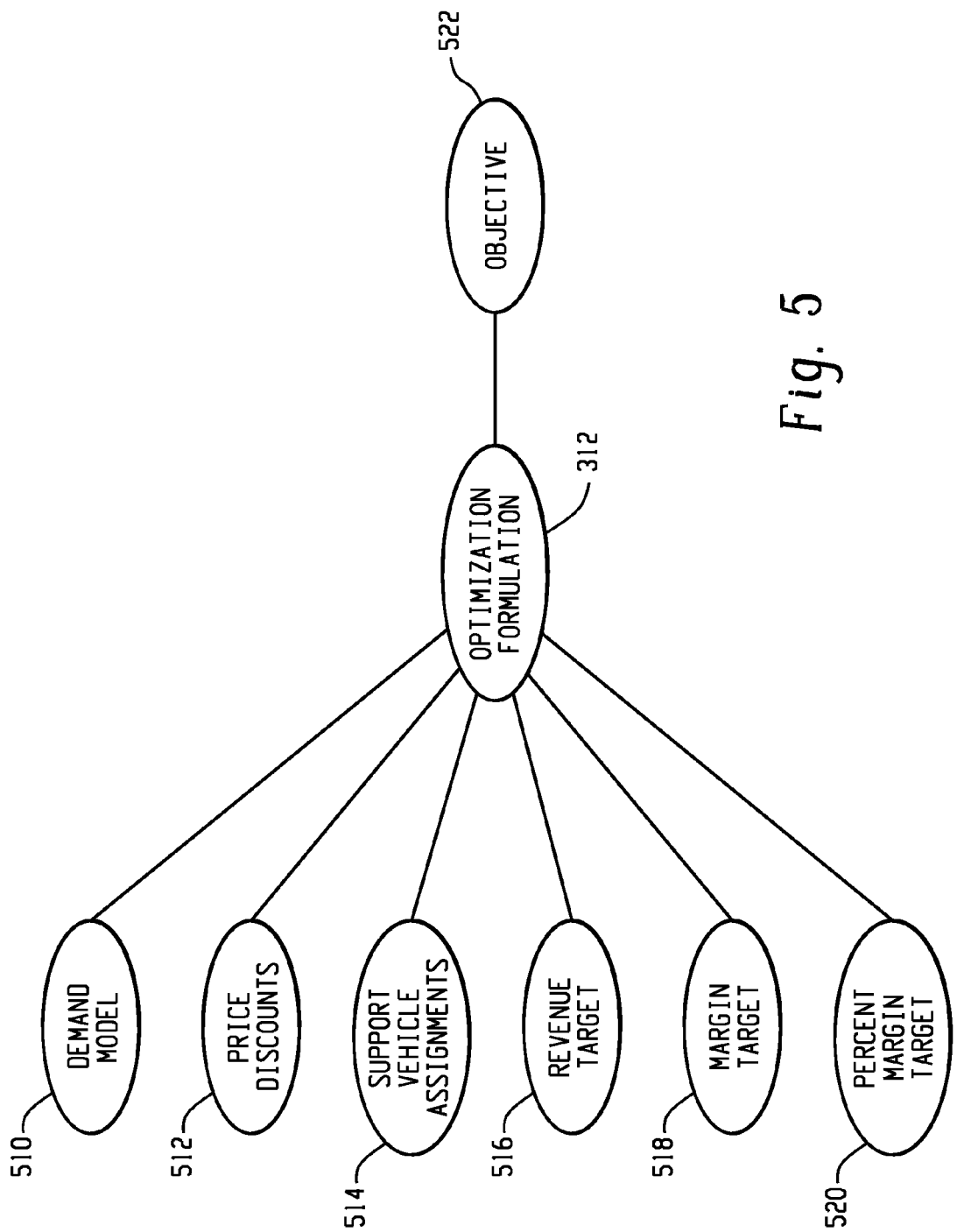

With reference to this notation and to FIG. 5, the optimization formulation 312 includes a direct demand model 510 for determining demand for item i at location l. The demand for item i at location l is determined by its own price and support vehicle assignments and by prices and assignments of other items that have cross effect on the demand of i. The direct demand model can take one of the two forms:
  Log-log Model
  Log-linear Model
The log-log Form of a direct model is as follows:

$$M_{iljp} = \left(\frac{p_j}{rp_j}\right)^{a_{iljp}} \quad (1)$$

$$M_{iljb} = e^{\alpha_{iljb}} \times X_{jb} + (1 - X_{jb}) \quad (2)$$

$$d_{il} = f_{il} \times \prod_{j \in I}(M_{iljp} \times M_{iljb}) \quad (3)$$

| | |
|---|---|
| $a_{iljp}$ = | elasticity coefficient denoting effect of price of item j on the demand of item i at location l. If i is same as j, then it represents the effect of price of item i on its own demand. |
| $M_{iljp}$ = | Multiplier denoting lift in demand of item i at location l due to price of item j during the promotion event. If it is less than 1, then discounting item j cannibalizes demand of item i. |
| $\alpha_{iljb}$ = | elasticity coefficient denoting effect of assigning item j to branch b of support vehicles on the demand of item i at location l. If i is same as j, then it represents the effect of assignment of item i on its own demand. |
| $M_{iljb}$ = | Multiplier denoting lift in demand of item i at location l due to the assignment of item j to branch b of support vehicles. If it is less than 1, then the assigning item j to branch b cannibalizes demand of item i. The multiplier is computed as sum of two terms. First term assumes non-zero value when $X_{jb}$ is 1, i.e., item i is assigned to branch b. In this situation, the first term represents the lift in demand of item i as a multiplier of base forecast. The second term assumes non-zero value when $X_{jb}$ is zero. In this case, the value of second term is 1 implying that the demand of item i remains unaffected if the assignment is not made. |

In this model, the demand of item i at location l, represented by $d_{il}$, is modeled as the base forecast multiplied by the lift multipliers resulting from price discounts and support vehicle assignments.

In the log-linear form of a direct model, only the price multiplier, $M_{ilj}$, of the log-linear differs from the log-log form:

$$M_{iljp} = e^{\left(\frac{p_j}{rp_j}-1\right) \times a_{iljp}} \quad (4)$$

where interpretation of the terms is the same as in the log-log model.

The support vehicle multipliers and the demand equation remain the same as in the log-log model.

In the optimization formulation 312, the driver variable is the price variable and $X_{ib}$, the variables indicating assignments of items to branches of support vehicles. In the optimization formulation 312, the price discounts 512 are as follows:

$$\sum_{g \in G} Y_{ig} \leq 1 \text{ for all items } i \quad (5)$$

Item i can be assigned to at most one point in the grid of promotion prices.

$$p_i = \sum_{g \in G} g Y_{ig} + \left(1 - \sum_{g \in G} Y_{ig}\right) \times rp_i \text{ for all items } i \quad (6)$$

The recommended price of an item is captured as the sum of two terms. The first term represents the promoted price if item is assigned to one of grid points. The second term represents the regular price when all $Y_{ig}$ variables for this i are set to zero.

In the optimization formulation 312, support vehicle assignments 514 are as follows:

$$\sum_i \sum_{b \in B_v} X_{ib} \leq Cap_v \text{ for all vehicles } v \quad (7)$$

The number of items assigned to a vehicle should not exceed the capacity of vehicle. If an item is assigned to a branch containing vehicle v, then it implies that the item is assigned to vehicle v. Hence, assigning an item to a branch results in assigning an item to all vehicles in the branch.

$$\sum_{b \in SB} x_{ib} \le 1 \quad (8)$$

An item could be assigned to at most one branch of support vehicles.

$$\sum_{b \in B_V} X_{bv} \le \sum_{g \in G} Y_{ig} \quad i, v \text{ pairs} \quad (9)$$

This ensures that an item assigned to vehicle v is also discounted using price promotion. It should be included for all i, v pairs where vehicle v requires price promotion also.

In the optimization formulation 312, the revenue target 516 is as follows:

$$rev = \sum_{il} d_{il} \times p_i \quad (10)$$

$$rev + r\text{Slack} \ge rev\text{Target} \quad (11)$$

Revenue should exceed the revenue target. Any shortfall in reaching the revenue target is captured by variable rSlack.

In the optimization formulation 312, the margin target 518 is as follows:

$$marg = \sum_{il} d_{il} \times (p_i - c_{il}) \quad (12)$$

$$marg + m\text{Slack} \ge marg\text{Target} \quad (13)$$

Margin should exceed the margin target. Any shortfall in reaching the margin target is captured by variable mSlack.

In the optimization formulation 312, the percent margin target 520 is as follows:

$$margPct = \frac{marg}{rev} \quad (14)$$

$$margPct + mt\text{Slack} \ge margPct\text{Target} \quad (15)$$

Percent margin should exceed the percent margin target. Any shortfall in reaching the percent margin target is captured by variable mtSlack.

In the optimization formulation 312, the demand target 520 is as follows:

$$dem = \sum_{il} d_{il} \quad (16)$$

$$dem + d\text{Slack} \ge dem\text{Target} \quad (17)$$

Demand should exceed the demand target. Any shortfall in reaching the demand target is captured by variable dSlack.

The objective 522 is then specified in terms of its components. Putting the components together leads to the overall objective, with the maximization terms as follows:

$$w_{demObj} \times dem + w_{revObj} \times rev + w_{margObj} \times marg + w_{margPctObj} \times margPct$$

where only one of four weights (w multipliers) is set to a nonzero value.

The other three key performance indexes (KPIs) are specified with a weight of zero resulting in only one KPI being maximized.

The optimization formulation 312 can also include target penalties as follows:

$$w_{rSlack} * r\text{Slack} + w_{mSlack} * m\text{Slack} + w_{mtSlack} * mt\text{Slack} + w_{dSlack} * d\text{Slack}$$

The weighted sum of slacks in achieving targets is to be minimized. Only one of the four weights is set to a non-zero value. The KPI used for setting the target should be different from the KPI that is used as the objective. Weights are set to be zero for KPIs not used as targets.

Figure 6:
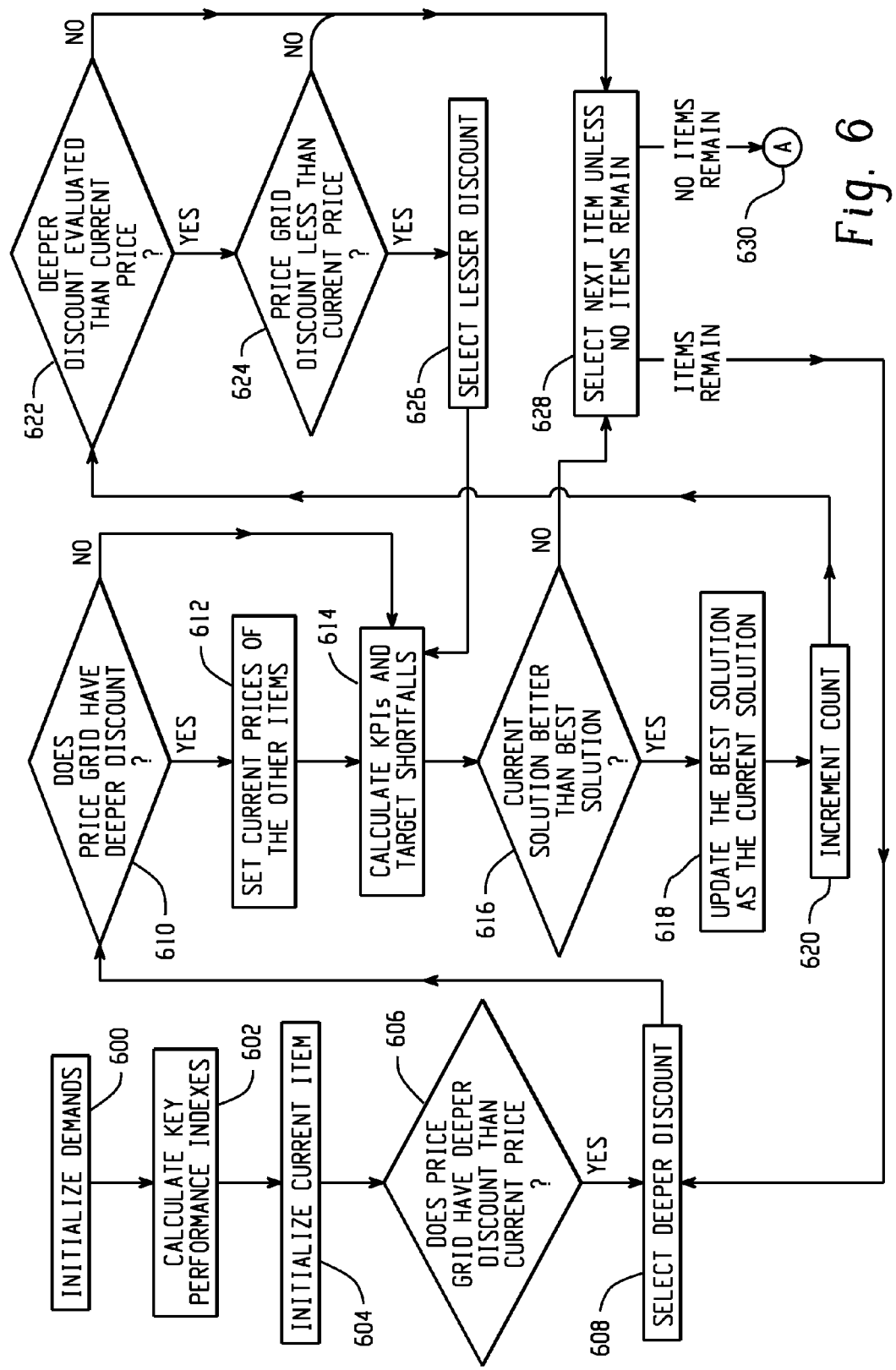
FIGS. 6 and 7 depict an example of an operational scenario involving a price promotion optimization formulation.
Figure 7:
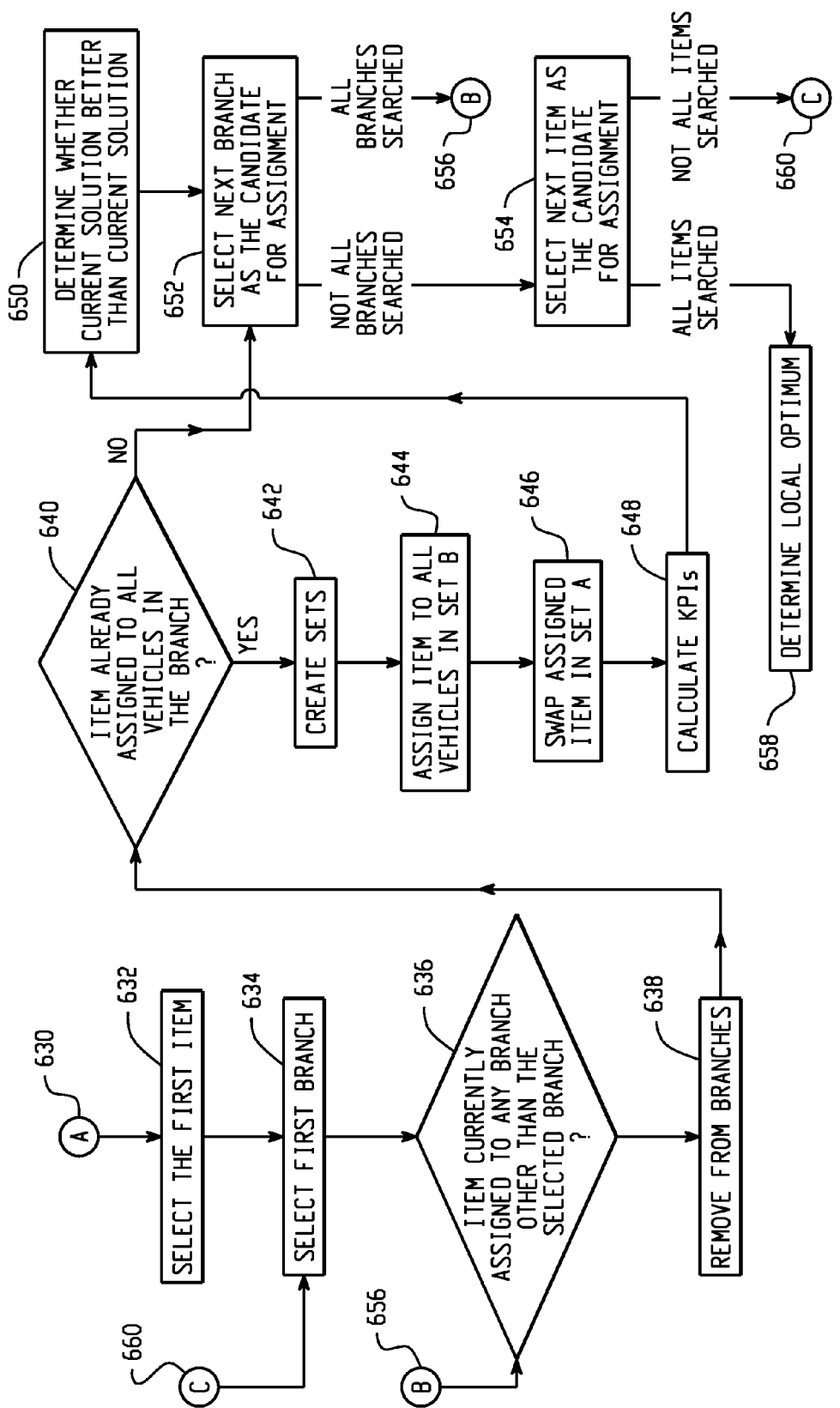

FIGS. 6 and 7 depict an example of an operational scenario involving such a mathematical formulation. As background, the operational scenario results in a determination of prices and assignments for a large-scale promotion optimization problem. The branches of support vehicles are grouped in sets such that an item should be assigned to at most one branch in the set. Multiple sets of branches can exist in a problem. It is noted that the processing flow delineates the steps for only one set of branches. Extending it to multiple sets can be done such as by introducing an additional loop.

The operational scenario generates a locally optimum solution of the original problem. It can generate a solution that can not be improved upon by making price changes or by performing item swaps on support vehicles. Due to the incremental evaluation of a solution from the previous solution, a large number of solutions can be evaluated in a short time to allow optimization of large-scale problems involving thousands of items and locations.

With respect to the operational scenario at step 600 in FIG. 6, demands at all (e.g., item, location) pairs are initialized to base forecasts. Prices of all items are initialized to regular prices. No items are currently assigned to support vehicles. This constitutes the starting solution.

At step 602 key performance indexes (KPIs) (e.g., revenue, margin, percent margin, and demand) and target shortfalls are calculated for the starting solution. The best solution is initialized as the starting solution. The count of "improving moves" is initialized to zero.

At step 604 the current item is initialized as the first item.

At steps 606 and 608, if the price grid has a deeper discount than the current price, then the deeper discount closest to the current price is selected.

At steps 610 and 612, if the current item is required to have the same price promotion as a set of other items, then the current prices of the other items is set the same as this price.

At steps 614 and 616, the KPIs (e.g., revenue, margin, percent margin, and demand) and target shortfalls are calculated for the current solution using the demand model described above. Calculation of new KPIs is performed by computing incremental changes from the previous solution. For example, if the price of item is changing from 25% to 33% discount, then it loses the lift received from 25% discount and gains the lift from 33% discount. The cross effect of this price change shows in the demands of other related items as well which shift from the effect of 25% discount to the effect of 33% discount. The other KPIs such as revenue and margin are correspondingly changed. KPIs of items not related by cross effect remain unchanged. Shortfalls from targets are updated using the incremental changes in the KPIs.

At steps 618 and 620, if the current solution is better than the best solution, then the best solution is updated as the current solution. Solutions are compared first on satisfaction of target. If the KPI target is not reached, then the solution that is closer to target is considered better. If the target is reached, then the solution with the higher value of KPI that is selected as the objective is considered better. If the best solution is updated, then the count of improving moves is incremented by 1 and processing proceeds to step 628; otherwise, processing continues to step 622.

At step 622, if step 614 evaluated a deeper discount than current price, then processing proceeds to step 626; otherwise it proceeds to step 628.

At steps 624 and 626, if the price grid has a lesser discount than the current price, then the lesser discount closest to the current price is selected and processing returns to step 614; otherwise, processing proceeds to step 628.

By step 628, either changing price of current item to an adjacent discount has updated the best solution or both increasing and reducing the discount has not succeeded in improving the best solution. The next item is selected and process returns to step 608. If no item remains, then processing proceeds to step 632.

By step 632, a move to adjacent prices has been tried on all items and improving moves have resulted in updating the best solution. The first item is selected at 632 as the current item and processing proceeds to step 634.

At step 634 the first branch of support vehicles is selected as the current branch.

At steps 636 and 638, if an item is currently assigned to any branch other than the selected branch, then it is removed from these branches. If the current solution is such that the item is already assigned to all vehicles in the branch, then processing continues to step 652; otherwise, processing proceeds to step 642.

At step 642, among the vehicles in the branch that do not have a current item assigned yet, a set A is created as the vehicles that have reached the capacity (i.e., limit on assignments), and B is set as the vehicles that have room to accommodate one or more items.

At step 644, an item is assigned to all vehicles in set B.

At step 646, an assigned item is swapped with the current item for vehicles in set A. An item to remove from the vehicle is selected as the item that gives the least contribution to the KPIs among the currently assigned items.

At step 648, KPIs (e.g., revenue, margin, percent margin, and demand) and target shortfalls are calculated for the current solution obtained by assignments and removals in steps 644 and 646. The demand model described above is used for calculating lifts. Calculation of new KPIs is performed by computing incremental changes from the previous solution. For example, if item 1 is removed from a vehicle and item 2 is assigned in its place, then the demand for item 1 is adjusted to remove the lift from assignment and the demand for item 2 is adjusted up to account for the lift from assignment. Cross effects of removing item 2 and assigning item 1 are also considered. Other KPIs such as revenue and margin are correspondingly changed. KPIs of items not related by cross effect remain unchanged. Shortfalls from targets are updated using the incremental changes in the KPIs.

At step 650, if the current solution is better than the best solution, then the best solution is updated as the current solution. Solutions are compared first on satisfaction of target. If a KPI target is not reached, then the solution that is closer to target is considered better. If a target is reached, then the solution with the higher value of KPI that is selected as the objective is considered better. If the best solution is updated, then the count of improving moves is incremented by 1.

At step 652, the next branch is selected as the candidate for assignment. If all branches have been searched, then processing proceeds to step 654; otherwise processing returns to step 636.

At step 654, the next item is selected as the candidate for assignment. If all items have been searched, then processing proceeds to step 658; otherwise, processing returns to step 634.

At step 658 if the count of improvements is zero, then a local optimum has been reached since no changes to adjacent prices or assignment swaps on support vehicles can improve the solution. If a local optimum is not reached, then the counter of improvements is reset to zero and processing returns to step 604; otherwise, processing stops.

It should be understood that, similar to the other processing flows described herein, the steps and the order of the steps in the processing flow of FIGS. 6 and 7 may be altered, modified, removed and/or augmented and still achieve the desired outcome.

Figure 8A:
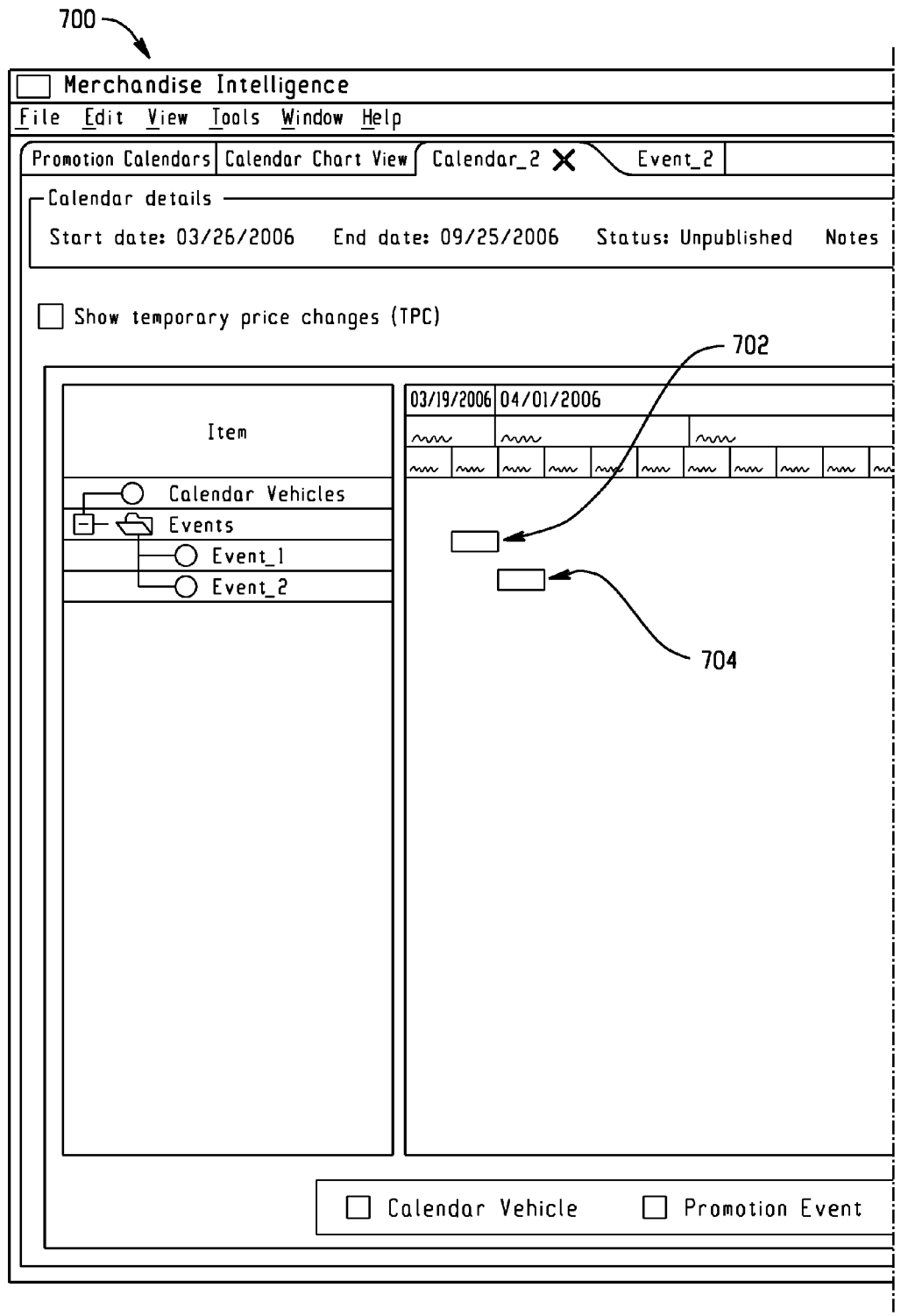
Figure 8B:
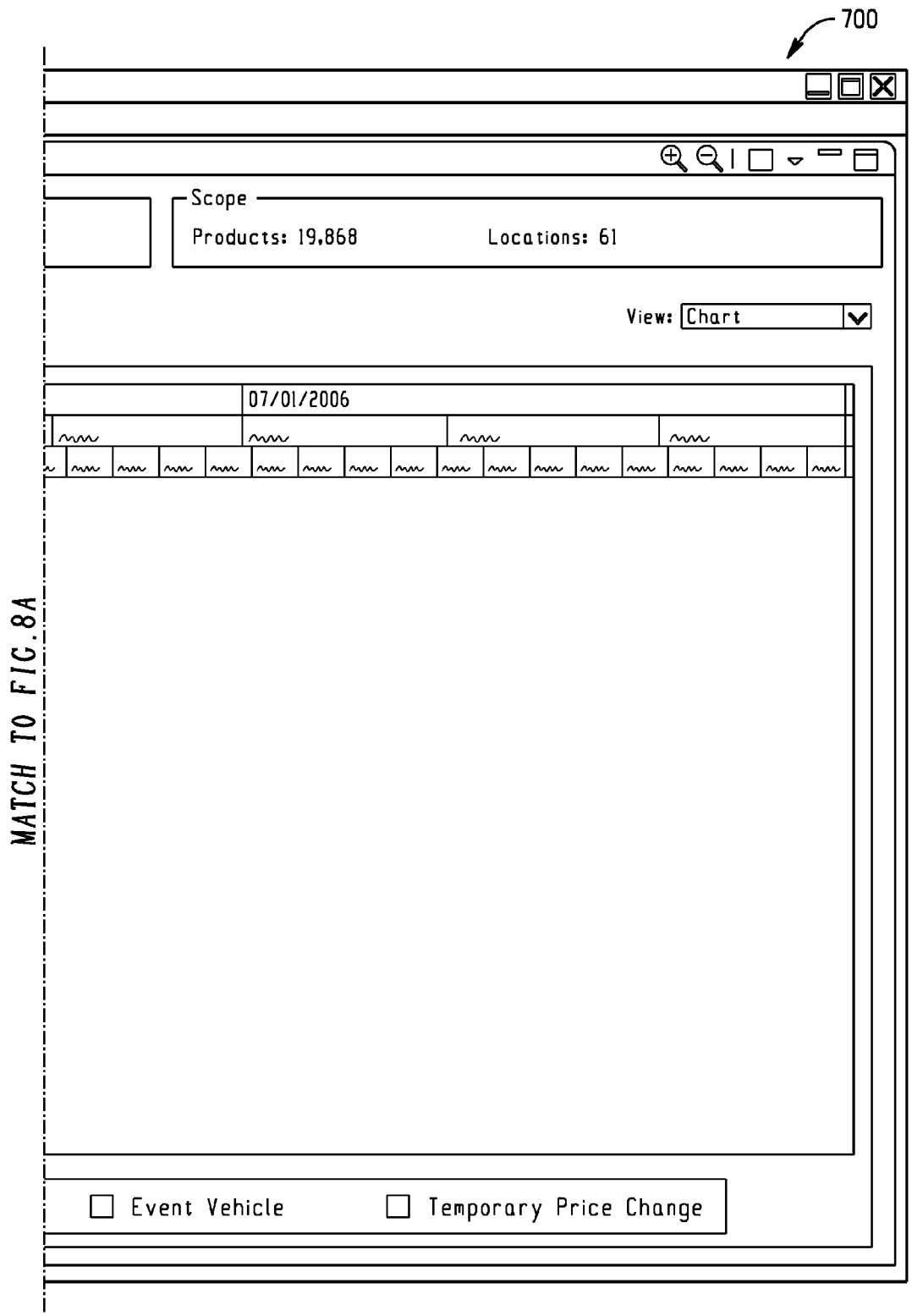

FIGS. 8-15 illustrate several user interface screens within the context of this operational scenario. FIG. 8 depicts at 700 a graphical user interface (GUI) having a promotion calendar. The promotion calendar contains multiple promotion events 702 and 704 over a time duration. In this example, the system addresses the planning of prices and promotions in one event at a time.

FIG. 9 depicts at 800 a GUI for defining a new vehicle for use in the selected promotion event. As mentioned above, each event is supported by promotion vehicles, e.g., flyers, in-store displays. In this example, GUI 800 is to create a promotion coupon vehicle and allows attributes of the coupon vehicle to be specified, such as start date, due date, vehicle circulation, vehicle distribution method, etc.

FIG. 10 depicts at 900 a GUI for creating a new plan for the selected promotion event (i.e., "event_1"). Planning for an event is initiated by creating a plan for event. A KPI is ultimately selected as the objective to be maximized in the plan. A number of other optimization related inputs can be set through the user interfaces as plan parameters.

Figure 11A:
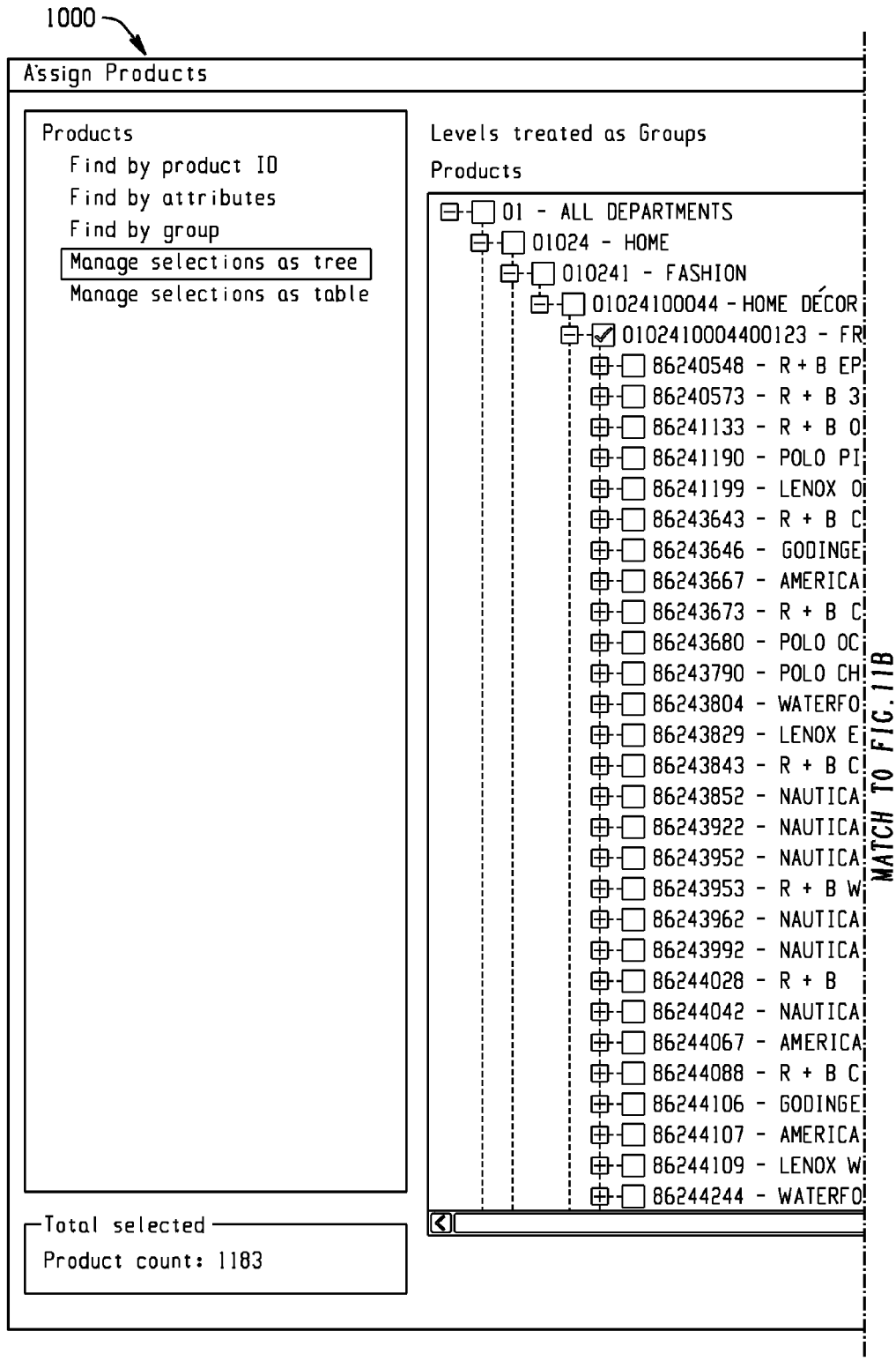
Figure 11B:
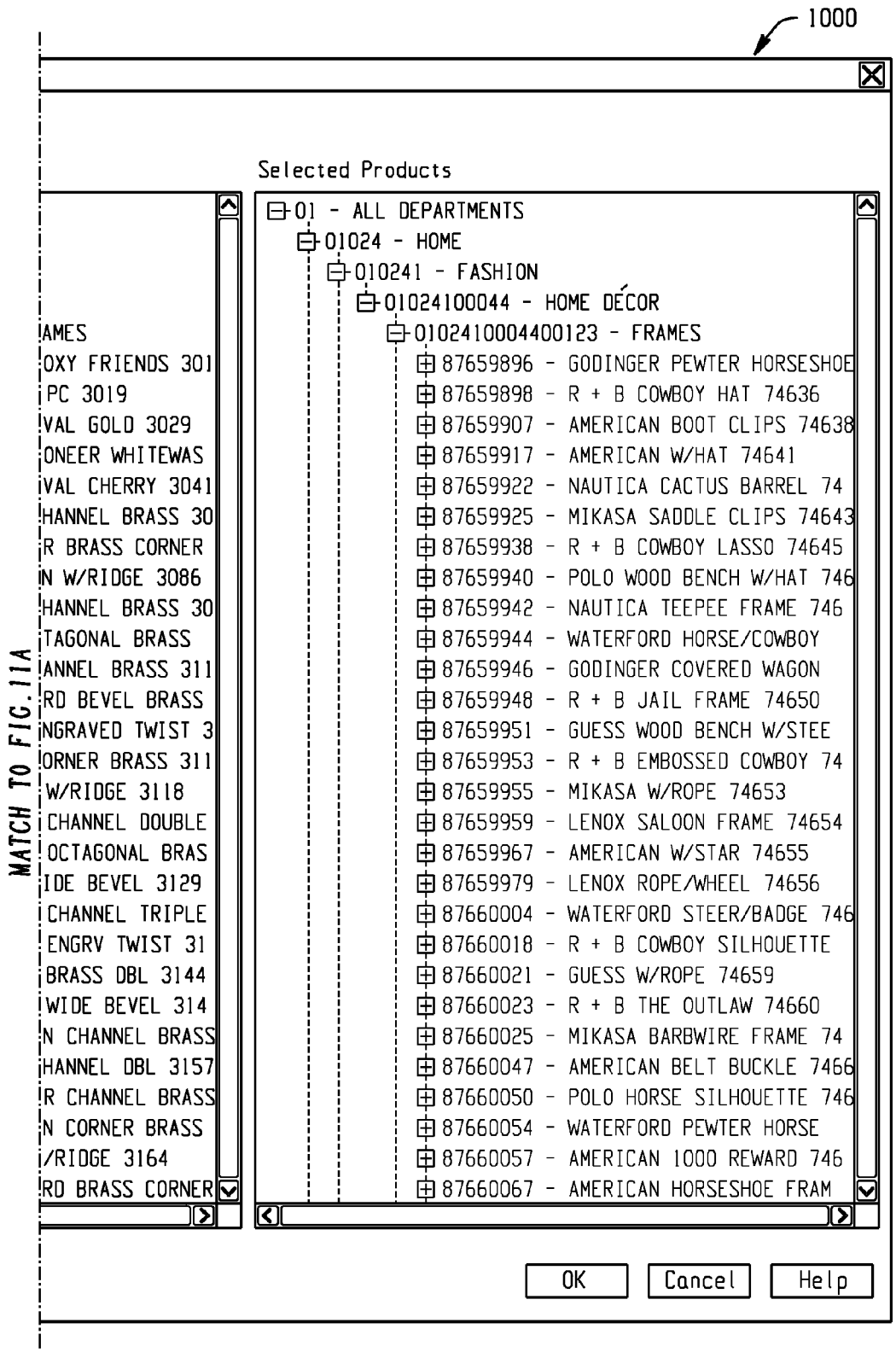

FIG. 11 depicts at 1000 a GUI for selecting a group of items (i.e., products) for making manual promotion decisions. Step 604 of the search algorithm depicted in FIG. 6 picks an item for promotion. Steps 608, 624, 634, and 652 determine the prices and vehicle assignments for the selected items. If some prices and assignments are selected by the user to be part of the solution, then these decisions are used as the starting solution and the search algorithm examines the remaining prices and assignments while keeping the initial solution intact. Hence, steps 608, 624, 634, and 652 select those prices and assignments that do not change the selections made by the user.

Figure 12A:
Figure 12B:
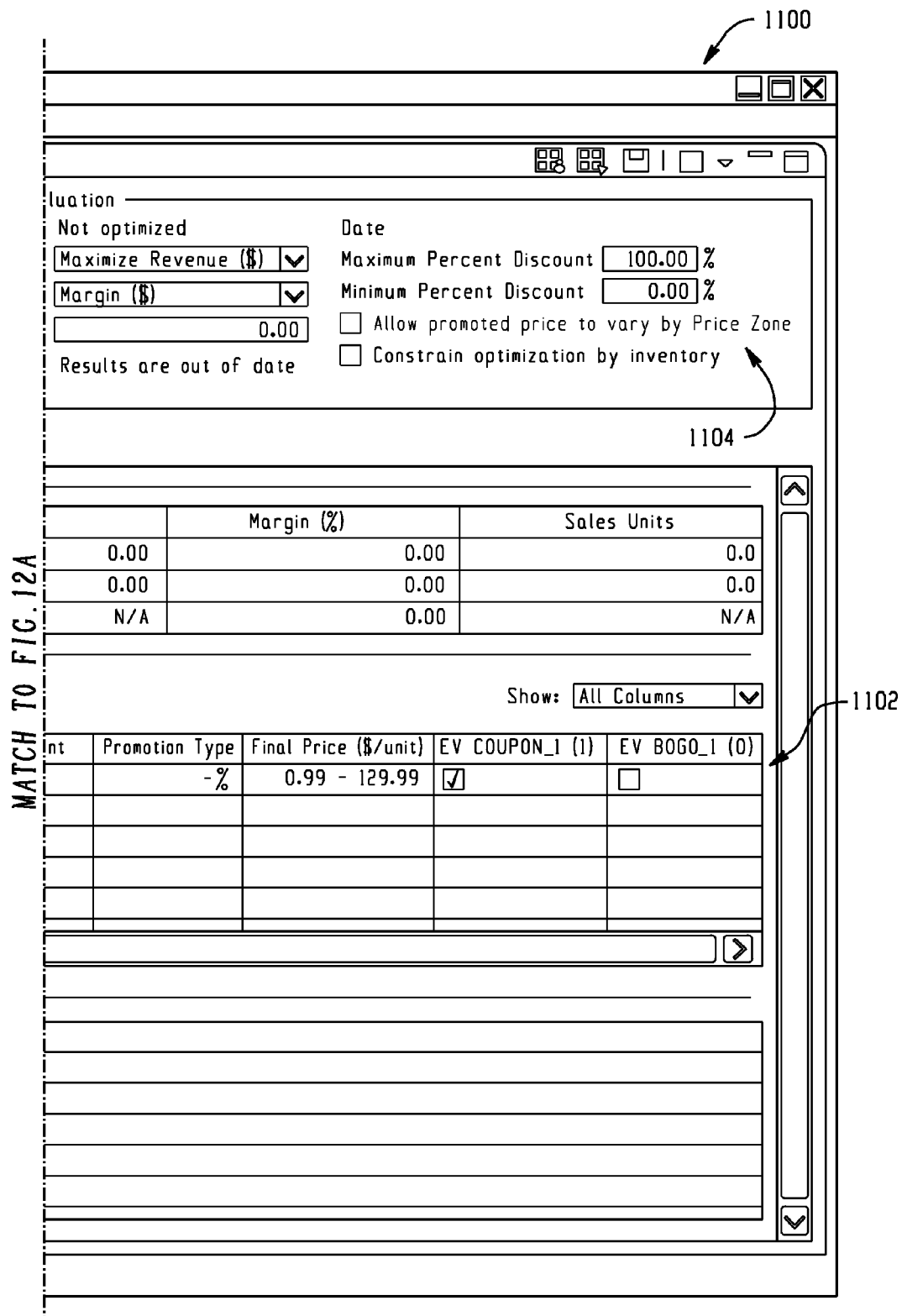

FIG. 12 depicts at 1100 a GUI wherein manual assignment is performed (as shown at 1102) of the selected item group to the COUPON vehicle. The user can make multiple price decisions (as shown at 1104) and assignments (as shown at 1102 and 1104) prior to optimizing the remaining decisions in steps 608, 624, 634, and 652.

Figure 13A:
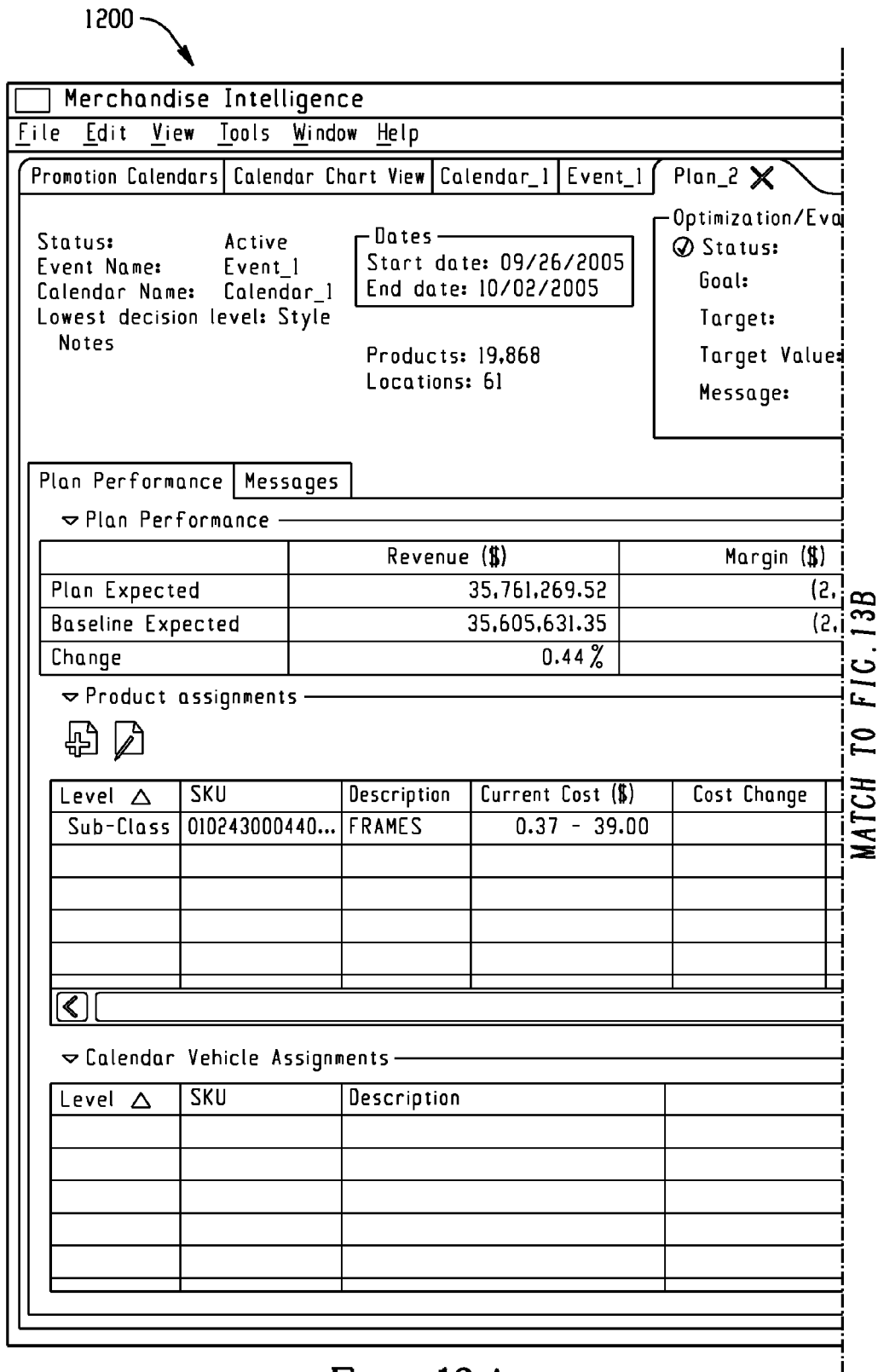
Figure 13B:
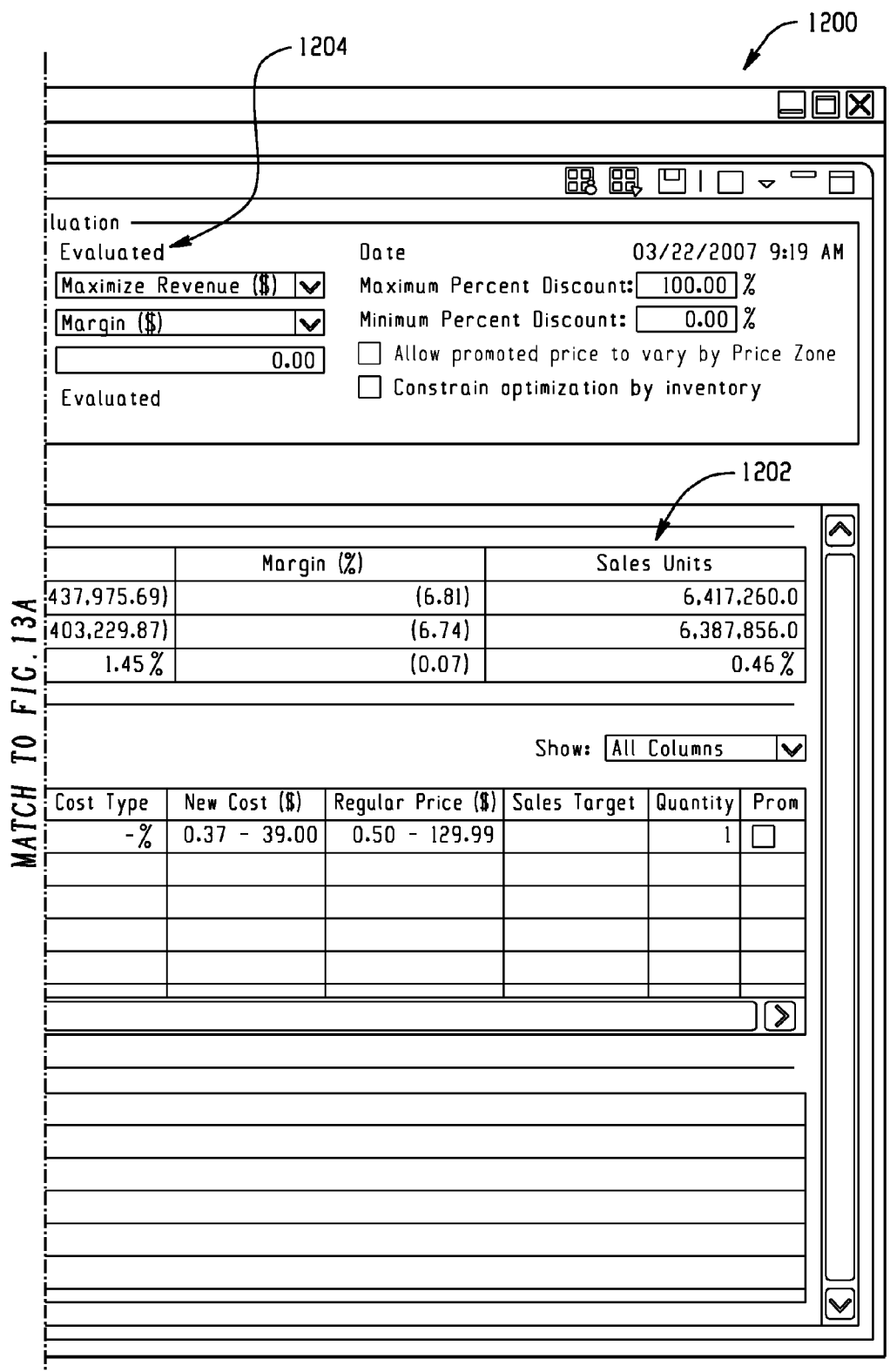

FIG. 13 depicts at 1200 a GUI for evaluating the effect of the manual assignment on the business metrics, e.g., revenue and margin. As shown at 1202, the user can evaluate the impact of the manual decisions on the relevant metrics before invoking optimization for remaining decisions. A processing status indicator is provided at 1204 on GUI 1200, which at this stage in the processing indicates that the impact of the manual decisions have been evaluated but optimization is still needed for the remaining decisions.

Figure 14B:
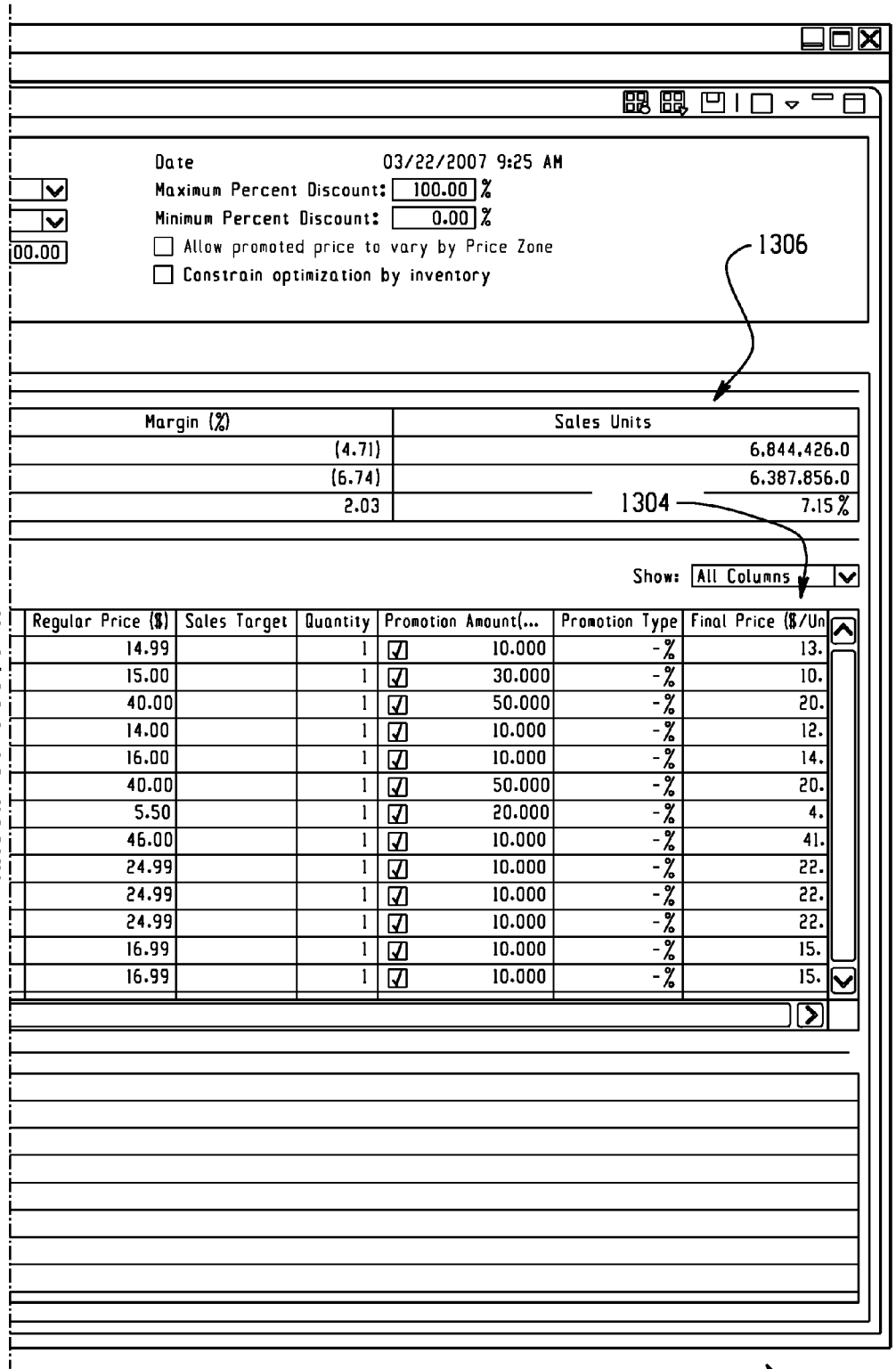

FIG. 14 depicts 1300 a GUI for determining optimal promotions of remaining items and updated values of business metrics. The user invokes optimization that will examine the range of prices and assignment decisions as discussed with respect to steps 608, 624, 634, and 652 for selecting the optimal decisions without changing the manual decisions made by the user. As shown by the status indicator 1302, the optimization process is complete with the optimized project assignments being shown at 1304. The performance of the plan based upon such assignments 1304 is shown at 1306.

FIG. 15 depicts at 1400 a GUI for specifying a limit on the price promotions. In this example, the user has specified at 1402 that the limit on the price promotions should be at most a 30% reduction in price. With this new limit, the optimization is re-run with the changed plan performance being shown at 1404 and product assignments at 1406. A user examines the optimal solution to see if any input parameters need to be reset to create alternative promotion plans.

Figure 16:
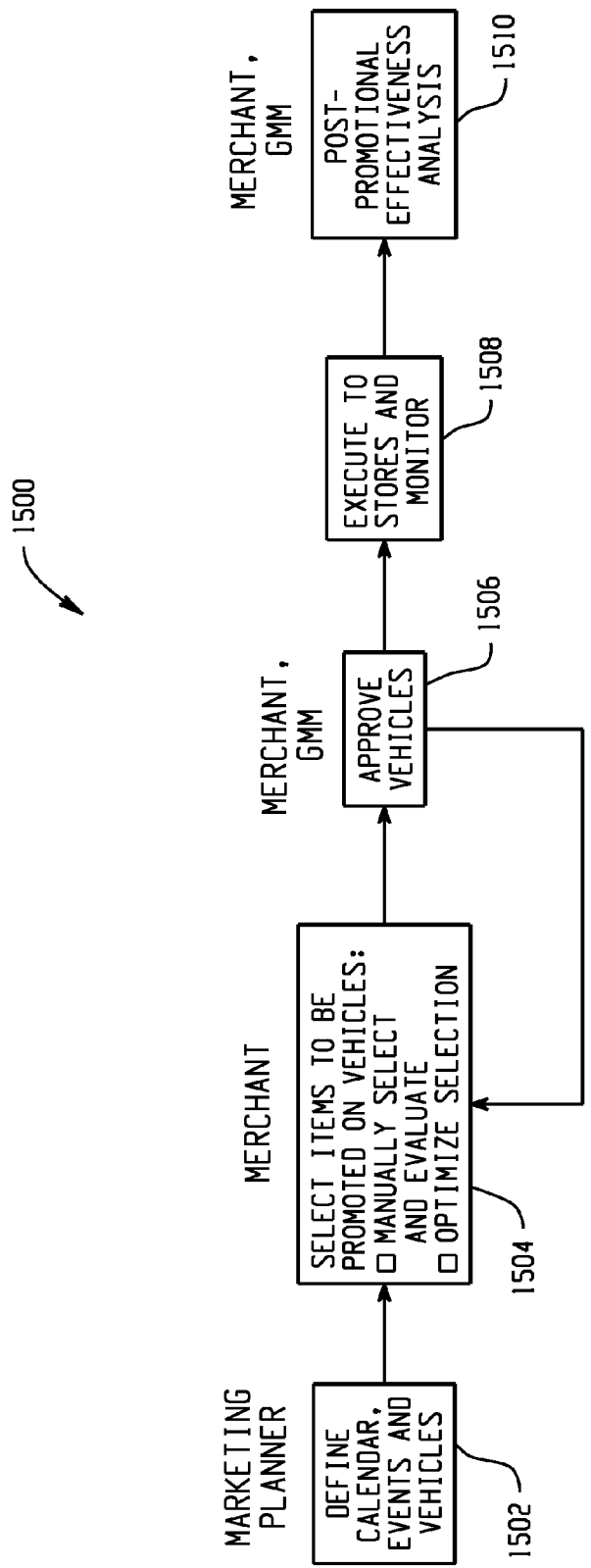
FIG. 16 is a flowchart depicting a workflow and various personnel that can be involved with a promotion price optimization system.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, FIG. 16 depicts at 1500 a workflow and various personnel that can be involved with a promotion price optimization system. With reference to FIG. 16, a marketing planner defines at step 1502 calendar information, event information, and vehicle information for use in promotion optimization analysis for an event. A merchant selects at step 1504 the items that are to be promoted on the defined vehicles. This step can involve manual selection for evaluation of the items with respect to the vehicles as well as optimization of the selection. A merchant and/or general merchandising manager (GMM) reviews and approves at step 1506 the vehicle selection. Upon review, the merchant and/or GMM can elect to have step 1504 repeated if necessary (e.g., to evaluate alternatives). After step 1506, the promotion plan that has been optimized by the system is executed at step 1508 in the stores, and its performance is monitored. Based upon the results of step 1508, post-promotional effectiveness analysis is performed at step 1510.

A price promotion optimization system streamlines the promotional planning process, i.e. between marketing and merchandising and can evaluate impact of promotional decisions on revenue and margin. Through the promotion plans and a price promotion optimization system, a user can handle many different types of promotion decision problems, such as:

Which events generate a significant impact on sales and profit?
Which items should we promote in an event? On which vehicles?
Which price points maximize sales? Profit?
What are the incremental and total sales forecast for promoted items?

The following provides an example of different operations and user interfaces of a promotion price optimization system that can be used within the workflow of FIG. 16.

In the workflow of FIG. 16, various personnel operate as users in implementing a sales promotion that is to be executed in one or more locations. The scope of that event consists of the set of products and locations that are associated with an event. The following tasks can be performed that involve events:

create an event
open an event
modify event details
modify the scope of an event
publish an event
delete an event When a user works with an event, the user typically creates event vehicles that advertise an event. The user also creates and works with event plans that define how to implement an event. Event vehicles and event plans automatically act within the scope of the event that contains them. Specific product assignments for an event vehicle or for an event plan are executed at all locations within the scope of an event.

To create an event, from any view of an open calendar, the user selects New Event from the Menu drop-down list that is located in the top-right corner of the calendar window. An example of a New Event dialog box appears at 1600 in FIG. 17. Within the interface 1600 of FIG. 17, a user completes the following steps to create a new event:

1. Enter a name for the event in the Name box. Names cannot be longer than 40 characters.
2. Enter a description of the event in the Description box. Descriptions cannot be longer than 40 characters. This step is optional.
3. Enter an identification number for the event in the Event Number box. This step is optional.
4. Enter the type of event in the Type box. This step is optional.
5. Enter a start date for the event in the Start date box. This date falls within the date range for the associated calendar.
6. Enter an end date for the event in the End date box. This date is after the start date and falls within the date range for the associated calendar. The default length of an event is one week.
7. If necessary, refine the scope-the set of available products and locations-of the event. By default, the event scope corresponds to the scope of the calendar in which the event is defined.
    Note: All event plans that a user creates for an event contain the same scope as the event. The scope of event plans cannot be modified.
8. Enter any notes about the event. Notes must not be longer than 255 characters.

To open an event, a user can open an existing event from any view of a calendar. When the user opens an event, the event window opens. The user can see the following information in the event window:

the name of the event in the title of the event window
event details:
    start and end dates
    event status
    Notes link
calendar details, including the calendar name, start and end dates, and status
a summary of the event scope:
    total number of products
    total number of locations
Event Summary tab:
    list of defined event vehicles
    list of defined event plans Event Performance tab:
event scope performance—the performance of all products in the scope of the event
promoted items performance—the performance of all products that have approved price changes
list of products that are assigned to the event To open the event window from any view of an open calendar, a user completes the following steps:
1. Select Open Event from the Menu drop-down list that is located in the top-right corner of the calendar window. The Open Event dialog box appears.
2. Select an event from the list.
3. Click OK to view the event window. Click Cancel to cancel.
   Note: In the calendar chart view, the user can click the bar in the chart that corresponds to the event that the user wants to view. The window for that event opens.

Figure 18:
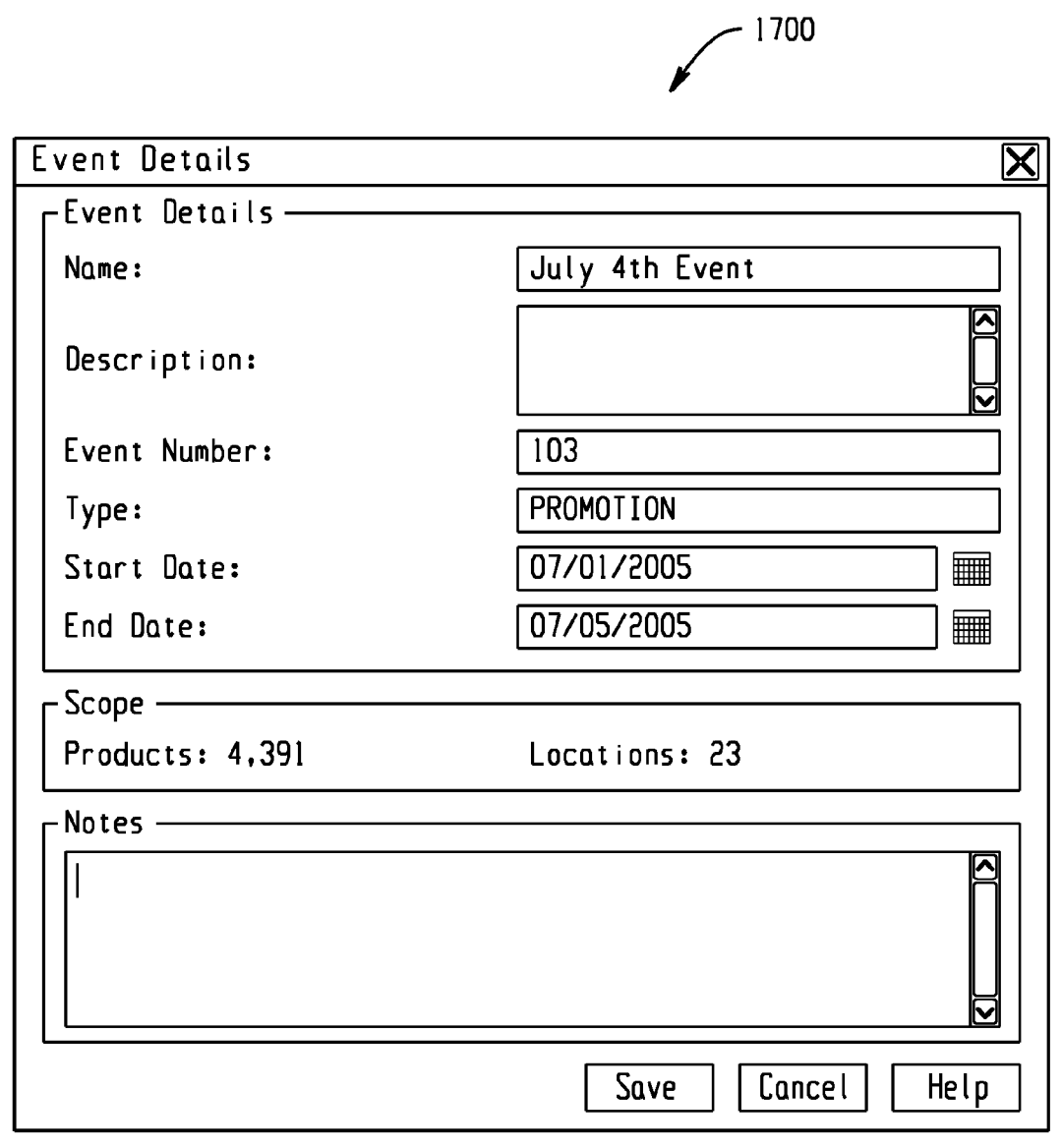

To modify event details, a user clicks the Event details link in an event window to open the Event Details dialog box, such as the one shown in 1700 in FIG. 18. A user accesses this dialog box to edit the details about an event. Within the interface 1700 of FIG. 18, a user completes the following steps to modify event details:
1. Enter the name of the event in the Name box. Names cannot be longer than 40 characters.
2. Enter a description of the event in the Description box. Descriptions cannot be longer than 40 characters. This step is optional.
3. Enter an identification number for the event in the Event Number box.
4. Enter the event type in the Type box.
5. Enter a start date for the event in the Start date box. This date falls within the date range for the associated calendar. The user can modify the dates for an event only if the event does not contain an active event plan.
6. Enter an end date for the event in the End date box. This date is after the start date and falls within the date range for the associated calendar. The default length of an event is one week.
7. Modify the scope of the event by clicking the Scope link. The Scope Definition dialog box appears.
   Note: All event plans that the user creates for an event contain the same scope as the event. The scope of event plans cannot be modified.
8. Enter any notes about the event. Notes must not be longer than 255 characters.

To view of modify the event scope, a user accesses the Scope Definition dialog box to modify the scope of an event. The scope of an event is the set of products and locations that are available to that event. The default scope of an event is the same as the scope for the calendar that contains the event. However, the user can refine the scope of an event to be a subset of the calendar scope. Event plans that the user creates contain the same scope as the associated event. Note: The user cannot modify the scope of an event if that event contains an active plan.

The user accesses the Scope Definition dialog box from the Scope link in the event window. Alternatively, the user accesses this dialog box from the Scope link in the Event Details dialog box.

After the user closes the Scope Definition dialog box, the number of products and locations that are included in the event scope is reflected in the Scope section of the event window.

The user can review the performance of an event on the Event Performance tab of an event window. This tab displays two tables that summarize the performance of the products and locations that are included in an event. The third table lists all products that are promoted in an event.

At the top of the Event Performance tab, there is a message area. The user is notified in this area when key performance indexes or indicators (KPIs) are out-of-date or when there are calculation errors. This area also displays the date and time when data was last updated. The user can update KPIs for an event by clicking Update KPIs. This button is dimmed if KPIs are up-to-date. Note: If there are errors during KPI calculation, a message appears in the Message tab for an event.

The Event Scope Performance table displays the KPIs for all products and locations that are included in the scope of an event. The Promoted Items Performance table displays KPIs for all products that are included in one or more event vehicles or that have promotional pricing (or both). The values that are displayed in these two tables are the same when the scope of an event is the same as the set of promoted products and locations. Any negative values are displayed in parentheses.

The columns that appear in the Event Scope Performance table and the Promoted Items Performance table are described in the following table:

| Column | Description |
| --- | --- |
| Event Scope Metric Categories | Three categories are summarized for the metrics in the Event Scope Performance table: Event Expected is the estimate of expected performance for all products and locations in the scope of an event. Baseline Expected displays the estimate of sales if there was no change from the last regular price. Change is the percentage change between the estimates for expected plan performance and expected baseline performance for each metric. |
| Promoted Items Metric Categories | Three categories are summarized for the metrics in the Event Scope Performance table: Promotions Expected is the estimate of expected performance for all products and locations that are promoted in an event. Baseline Expected displays the estimate of sales if there was no change from the last regular price. Change is the percentage change between the estimates for expected plan performance and expected baseline performance for each metric. |
| Revenue ($) | Estimate of revenue dollars |
| Margin ($) | A measure of sales productivity, calculated as follows: margin ($) = total revenue − total cost |
| Margin (%) | A measure of sales productivity, calculated as follows: margin (%) = (sales revenue − cost of goods sold)/sales revenue |
| Sales Units | The total number of units sold for products in a plan |

The Promoted Products table lists the set of products that are included in an event vehicle or that have promotional pricing (or both). The user can control the columns that appear in this table. The user selects the columns that the user wants to see in the Promoted Products table from the Show drop-down list. These are the default column sets:
All Columns
Price Columns
Assignment Columns
Performance Columns
My Columns The user can modify the columns that appear for each column set by selecting that set from the Show drop-down list and selecting Customize Columns from the Menu dropdown list that is located in the top-right corner of the current window. Note: Any negative values are displayed in parentheses.

When the user publishes an event, that event becomes visible to all users whose scope overlaps with the event in at least one product and location. The user can make modifications to the scope of an event after it has been published, although the user cannot change the start or end dates for an event after it has been published.

To publish an event from the event window, the user completes the following steps:

1. Select Publish Event from the Menu drop-down list that is located in the top-right corner the event window.
2. In the Publish Events dialog box, click Yes to publish the event. Click No to cancel the publish request.
3. If the user selected to publish the event, a dialog box appears that displays the status of the publish request. Click OK to continue working.

To publish an event from the list of events for a calendar, the user completes the following steps:

1. Highlight the row for the event that the user wants to publish.
2. Select Publish Event from the Menu drop-down list that is located in the top-right corner the calendar window.
3. In the Publish Events dialog box, click Yes to publish the event, or click No to cancel the publish request.
4. If the user selected to publish the event, a dialog box appears that displays the status of the publish request. Click OK to continue working.

The user can delete an event to remove it from a calendar. This removes the event and all associated event vehicles and event plans for that event. To delete an event from the event window, complete the following steps:

1. Select Delete Event from the Menu drop-down list that is located in the top-right corner of the event window.
2. In the confirmation dialog box, click OK to delete the event. Click Cancel to cancel the delete request.

To delete an event from any view of a calendar window, the user completes the following steps:

1. Select Delete Event from the Menu drop-down list that is located in the top-right corner of the calendar window. The Delete Event(s) dialog box appears.
2. Highlight one or more events that the user wants to delete.
3. Click Delete to delete the selected event(s), or click Cancel to cancel the delete request.
4. In the confirmation dialog box, click OK to delete the selected event(s). The event is removed from the list of events for the calendar. Alternatively, click Cancel to cancel the delete request. If the user clicks Cancel, the user returns to the Delete Event(s) dialog box.

With respect to event vehicles, an event vehicle is a tool, such as a radio commercial or a newspaper insert, that supports a promotional event. The following provides information about the tasks that the user can perform with vehicles in the event window.

The user clicks the Event Vehicles label in the event window to view the list of existing event vehicles. From the Event Vehicles section, the user can perform the following tasks:
create a vehicle
view or modify the details of an existing vehicle
delete a vehicle To create an event vehicle, a user completes the following steps to add a vehicle to the list of event vehicles in the event window:

1. Click the Add interface item above the list of event vehicles. The Select Vehicle Category dialog box appears.
2. Select the desired vehicle category from the list.
3. Click OK to continue to the New Vehicle dialog box. Alternatively, click Cancel to cancel creation of the vehicle.
4. Define the vehicle in the New Vehicle dialog box.

To view an event vehicle's details, a user accesses the Vehicle Details dialog box to view or modify details for an event vehicle. In this dialog box, the user can make changes to the following settings for a vehicle:
name
start and end dates
number of advertising spots
pricing restrictions
breakdown of advertising spots across product categories
any relevant vehicle attributes A user completes the following steps to view or modify details about a vehicle that appears in the Event Vehicles list of the event window:

1. Click the name of a vehicle.
2. Select Vehicle Details from the Menu drop-down list that is located in the top-right corner of the event window. The Vehicle Details dialog box appears.
3. Review or modify any of the settings from the list above.
4. Click Save to save the changes. Click Cancel to cancel any changes that were made in this dialog box. To view Help for this dialog box, click Help.

To delete an event vehicle, the user can delete any vehicle in the event vehicle list of the event window. To do this, the user completes the following steps:

1. Select the row for the vehicle that is to be deleted.
2. Select Delete Vehicle from the Menu drop-down list that is located in the top-right corner of the event window.
3. In the Confirm Delete dialog box, click Yes to delete the vehicle. Click No to cancel the delete request.

With respect to event plans, a user accesses an event plan to work with individual products. For each plan, the user can perform the following tasks:
assign the products and locations to include in an event
set plan goals and optimization constraints
determine promotional pricing by completing one of these tasks:
  Optimize. This enables the system to set promotional prices.
  Manually set promotional prices.
review plan progress The user clicks the Event Plans label in the event window to view the list of existing event plans. From the Event Plans section, the user can perform the following tasks:
create a new event plan
view or modify the details of an existing event plan
copy an event plan
delete an existing event plan To create an event plan, a user completes the following steps to create an event plan:

1. Select New Plan from the Menu drop-down list that is located in the top-right corner of the event window. The New Plan dialog box appears, such as the interface 1800 shown in FIG. 19.
2. Enter descriptive information about the plan:
   (a) Enter a name for the plan in the Name box. Names cannot be longer than 40 characters. All event plans that are defined for an event have unique names.
   (b) Enter an optional description of the plan in the Description box. Descriptions cannot be longer than 40 characters.

(c) Select the lowest level in the product hierarchy that is affected by the plan from the Lowest decision level drop-down list.

Note: The values that appear in this drop-down list were entered by a solution administrator during configuration.

(d) Review the start and end dates for the plan. These dates correspond to the start and end dates for the event and cannot be modified.

(e) To allow product prices to vary across pricing zones, select the Price by zone check box.

3. Review the products and locations that are associated with the plan by selecting the Scope link. The Scope Definition dialog box appears and displays the scope for the current event. The scope of an event plan is inherited from the event scope and cannot be modified. The Scope section of the Plan Details dialog box displays the count of total products and locations that are part of the scope for this plan.

4. Enter any notes about the plan in the Notes box. Notes cannot be longer than 255 characters.

5. Click Save to save the event plan. Click Cancel to cancel creation of the event plan. Click Help to view online Help information.

To modify an event plan, the user can modify an event plan in the event plan window. To do this, the user opens an event plan window by selecting the name of the plan from the Event Plans list in an event window. Then the user selects Open Plan from the Menu drop-down list that is located in the top-right corner of the event window. The event plan window opens with the name of the event plan as the title of the window and displays details about the event plan. An example of this interface window is shown at 1900 and FIG. 20. From the event plan window 1900, the user can perform the following tasks for an event plan:

modify plan details, including the plan name, description, decision level, and notes modify the products that are assigned to a plan:
    review the products and locations that are included in the scope of the event plan
    select the products that are eligible for promotional pricing in the Product assignments list
    assign products to event vehicles modify plan goals and optimization/evaluation constraints optimize a plan, allowing the system to calculate optimal promotional pricing for assigned products evaluate a plan, allowing the system to predict the results of promotional pricing that the user has entered manually review plan performance review any messages that resulted from optimization or evaluation The user accesses the Plan Details dialog box to modify the details for an event plan, such as the dialog box 2000 depicted in FIG. 21. Within the dialog box 2000, the user completes the following steps to modify the event plan details:

1. Enter descriptive information about the plan:
   (a) Enter a name for the plan in the Name box. Names cannot be longer than 40 characters.
   (b) Enter a description of the plan in the Description box. Descriptions cannot be longer than 40 characters. This step is optional.
   (c) Select the lowest level in the product hierarchy that is affected by the plan from the Lowest decision level drop-down list.
   (d) Review the start and end dates for the plan. These dates correspond to the start and end dates for the event and cannot be modified.

2. Review the products and locations that are associated with the plan by selecting the Scope link. The Scope Definition dialog box appears and displays the scope for the current event. The scope of an event plan is inherited from the event scope and cannot be modified. The Scope section of the Plan Details dialog box displays the count of total products and locations that are part of the scope for this plan.

3. Enter any notes about the plan in the Notes box.

4. Click Save to save the event plan. Click Cancel to cancel changes to the event plan. Click Help to view online Help for this dialog box.

When the user opens an event plan or a temporary price change (TPC), the user sees a message that tells the user that regular prices are being retrieved. No changes can be made to an event plan or a TPC until all regular prices have been loaded.

To modify the goals and constraints for an event plan, in the optimization/evaluation section of the event plan window, the user can see information about the event plan status and optimization and pricing constraints. This information includes the following:

event plan status the date that this plan status was achieved any system messages that pertain to an event plan To set optimization goals and price constraints for an event plan, the user completes the following steps:

1. Set the optimization goal. This goal is used for optimization only, and does not apply to promotional prices that the user enters manually. The user can choose from these options:
   maximize revenue dollars
   maximize margin dollars
   maximize margin percentage 2. Set an optimization target. This target is used for optimization only, and does not apply to promotional prices that the user enters manually. The user can choose from these options:
   margin dollars
   margin percentage 3. Set a target value that corresponds to the selected plan target. A successful optimization must reach this target value.

4. Set promotional pricing constraints.
   (a) Enter a maximum discount percentage in the Maximum Percent Discount box. This value is between 0 and 100, and it is larger than the minimum discount percentage.
   (b) Enter a minimum discount percentage in the Minimum Percent Discount box. This value is between 0 and 100, and it is smaller than the maximum discount percentage.
   (c) Review the setting for pricing between price zones. This is set during plan creation and cannot be modified. If pricing can vary between price zone, there is a check in the check box for Allow promoted price to vary by Price Zones.
   (d) To constrain optimization results by inventory levels, select Constrain optimization by inventory. The final optimization result is the one that meets the plan goal and target value with the minimum inventory level.

To select the products that are assigned to a plan, the Product assignments list displays the products that are assigned to an event plan or an event vehicle. Each row in the Product assignments list represents either a single product or a group of products from the product hierarchy. The user can control the columns that appear in the Product assignments list. The user selects the columns that the user wants to see in the Product assignments list from the Show drop-down list. These are the default column sets:

All Columns
Price Columns
Assignment Columns
Performance Columns
My Columns

The user can modify the columns that appear for each column set by selecting that set from the Show drop-down list and selecting Customize Columns from the Menu dropdown list that is located in the top-right corner of the current window.

If there are products that are in the scope of an event and that are included in an overlapping TPC, those products appear in the event list automatically. All rows for those products are dimmed in the Product assignments list and promotional pricing is limited if there are already approved price changes.

Similarly, products for overlapping calendar vehicles appear in the Calendar Vehicle Assignments list. The products and the name of the calendar vehicle are displayed in this list. This is list is read-only, and it is shown for the user's reference. The user opens the appropriate calendar vehicle window to make changes to the list of products that are assigned to a calendar vehicle.

To modify the entries in the product assignments list for a manual plan, the user adds products or product groups to the Product assignments list so that the user can work with them. In this list, the user indicates promotional prices for products, and the user assigns products to event vehicles.

Figure 22:
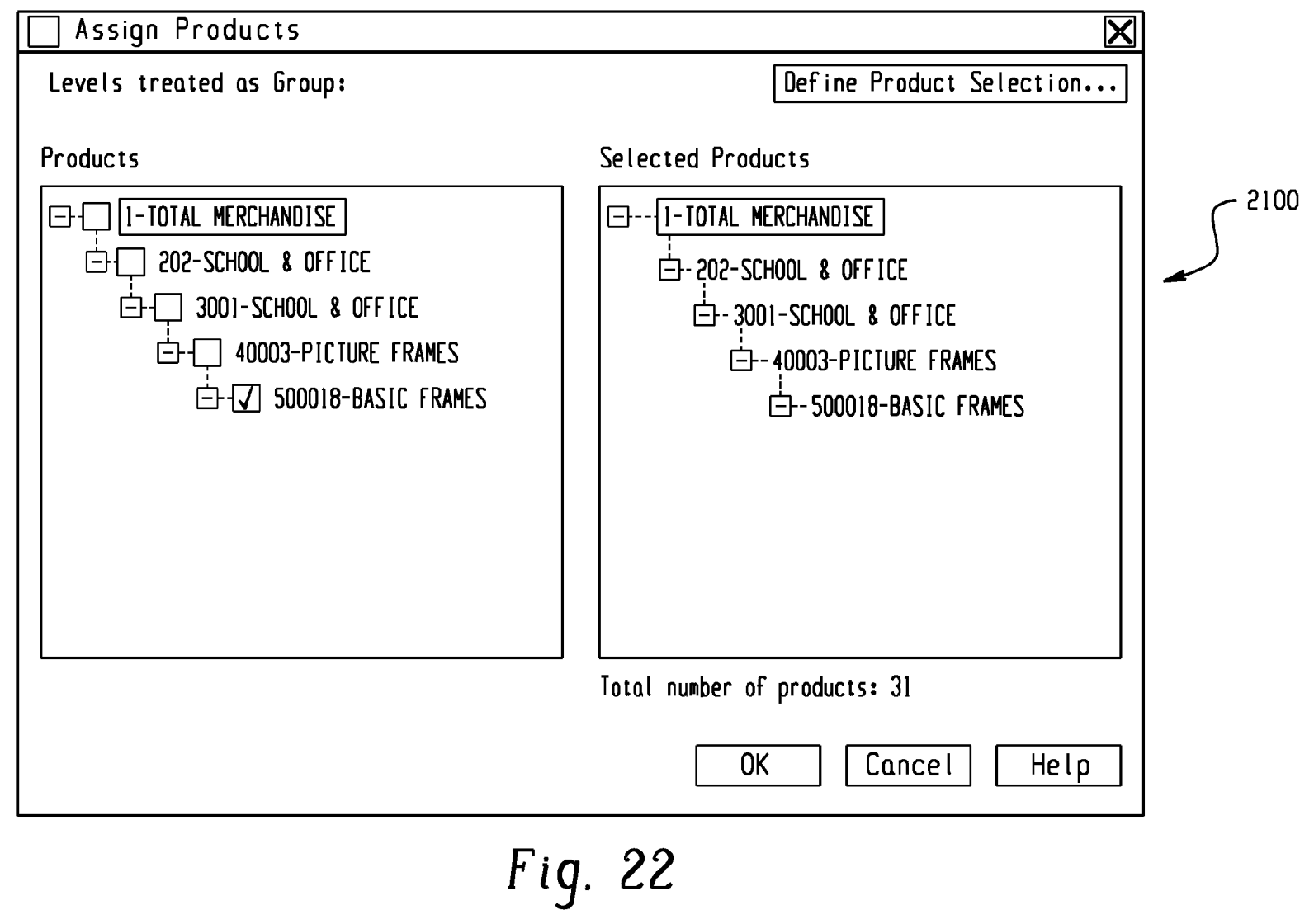

For an optimized plan, all products that are in the event scope are eligible for promotional pricing and for inclusion in event vehicles. The optimization process selects products from the event scope for promotional pricing and vehicle assignment. The selected products are added to the Product assignments list automatically. However, if there are products that the user wants to designate for promotional pricing or for inclusion in an event vehicle, then the user can add them to the Product assignments list. Similarly, if there are products that the user wants to exclude from promotional pricing or from inclusion in an event vehicle, then the user can add those products to the Product assignments list. After the user adds them to the list, the user indicates whether to include or to exclude them from optimization results, such as through the dialog box 2100 depicted in FIG. 22. Within the dialog box 2100, the user completes the following steps to add products to the Product assignments list:

1. Click the interface item to open the Assign Products dialog box.
2. In the Products box, click the check box beside the products that the user wants to add to the Product assignments list. Selected products appear in the Selected Products box to the right.
    Note: To price products as a group—generally by using a percentage discount-select a product category rather than individual products. Even when the user assigns a group of products to the product list, the user can select to treat one or more subproducts in the category individually. Pricing is assigned to those products independent of the price rule for the group of products.
3. To assign products using the Define Product Selection dialog box, click Define Product Selection. This step is optional.
4. Click OK to complete the user's product selection. Click Cancel to cancel changes to the list of product assignments. To view this information, click Help.

To remove products from the Product assignments list, the user highlights those products and click the interface item. In the confirmation dialog box, the user clicks OK to complete the deletion request. The user clicks Cancel to cancel the request.

To enable calculation of optimal promotional prices for the products in an event plan, the user needs to optimize that event plan. During optimization, the system selects a subset of products and locations from the event scope and calculates all allowable pricing combinations to determine the solutions that meet the plan target value. From this set of solutions, the one that maximizes the event plan goal is used to set promotional prices. During optimization, these actions occur:

products are added to the Product assignments list
a promotional amount and type are determined for selected products
selected products are assigned to event vehicles Note: Before the user optimizes an event plan, all regular prices and supply costs are loaded. In the event plan window, the user verifies that the status bar (in the lower right of the Revenue Optimization window) does not indicate "Getting regular prices."

To optimize an event plan from the event plan window, the user completes the following steps:

1. To force a price promotion of one or more products, select the check box in the Promotion Amount column of the Product assignments list. This step is optional.
2. To include one or more products in an event vehicle, select the check box in the vehicle column for the product(s) in the Product assignments list. This step is optional.
3. To exclude one or more products from promotional pricing, select the product(s) in the Product assignments list and select Exclude Promotion from the Menu dropdown list that is located in the top-right corner of the event plan window. This step is optional.
4. To exclude one or more products from a vehicle, select the product(s) from the Product assignments list and select Exclude Vehicle from the Menu dropdown list that is located in the top-right corner of the event plan window. This step is optional.
5. Select Optimize from the Menu drop-down list that is located in the top-right corner of the window.

To optimize an event plan from the event window, the user completes the following steps:

1. Select the plan that the user wants to optimize from the Event Plans list.
2. Select Optimize from the Menu drop-down list that is located in the top-right corner the event window.

Optimization might take some time, depending on the number of products and locations that are included in the plan. When optimization is complete, promotional prices appear in the Promotion Amount column of the Product assignments list. In addition, any event vehicle assignments are indicated with a green check in the column for that vehicle. Because optimization might take some time, the user can continue working in another view or the user can close the application. Optimization continues in the background. Note: Each row in the Product assignments table is treated independently during optimization. This is true even if a product on one row is a subproduct of another row.

To assign products to an event vehicle manually, the user can use the Product assignments list to control product assignments to event vehicles. Each event vehicle has a check box column in the Product assignments list. The user can look at this column to see which products have been assigned to or excluded from the associated event vehicle.

If the user optimizes a plan, assigning a product to an event vehicle forces all optimized solutions to include the product in that event vehicle. Similarly, excluding a product forces all optimized solutions to exclude the product from that event vehicle.

To assign a product to an event vehicle, the user completes the following steps:
1. Scroll to the appropriate vehicle column.
2. Select the check box in the vehicle column to assign the product(s) in a row to an event vehicle. A check appears and indicates that a product (or a group of products) has been assigned to a vehicle.
   Note: If a row is dimmed, then the user cannot assign it to or exclude it from an event vehicle.

To exclude one or more products from an event vehicle, the user completes the following steps:
1. Select the row(s) from the Product assignments list for the products that the user wants to exclude from an event vehicle.
2. Select Exclude Vehicle from the Menu drop-down list that is located in the top-right corner of the event plan window. The Exclude Vehicle dialog box appears.
3. Select the vehicles that the user wants to exclude the selected products from and click OK. A red "x" appears in the check box for all products that the user can assign for the appropriate event vehicles. Alternatively, click Cancel to cancel the request.
   Note: If a row is dimmed, then the user cannot assign it to or exclude it from an event vehicle.

To enter changes in price or cost manually and evaluate an event plan, a user accesses the Product assignments list to enter prices when those prices apply across price zones. If the user is setting prices that vary across price zones, then the user accesses the Set Price By Price Zone dialog box. Note: If the user optimizes an event plan, then the user can force a product to always have promotional pricing by selecting the check box in the Promotion Amount column of the Product assignments list. The user does not have to enter a price in the Promotion Amount cell. The user can designate the type of promotional price in the Promotion Type column.

To enter promotional prices manually in the Product assignments list, the user completes the following steps:
1. Scroll to the Promotion Amount column of the Product assignments list.
2. Enter an amount in the Promotion Amount cell for each product.
3. Select a promotion type from the drop-down list in the Promotion Type cell to the right. The user can select from these options:
   –% a percentage discount from the last regular price
   –$ a dollar discount from the last regular price
   $ a promotional price To enter changes in cost in the Product assignments list, the user completes the following steps:
1. Scroll to the Cost Change column of the Product assignments list.
2. Enter an amount in the Cost Change cell for a product.
3. Select a cost type from the drop-down list in the Cost Type cell to the right. The user can select from these options:
   –% a percentage discount from the last cost of a product
   –$ a dollar discount from the last cost of a product
   Note: To indicate a cost increase, enter a negative value in the Cost Change column, and then select the appropriate cost type, –% or –$. The user can verify the increase in cost in the New Cost column.

To evaluate the effects of cost or price changes, after the user enters changes to promotional prices (or to costs), the user evaluates the effect of these changes for an event plan. To evaluate an event plan, the user selects Evaluate from the Menu drop-down list that is located in the top-right corner of the event plan window.

To set prices by zone and evaluate an event plan, a user accesses the Set Price By Price Zone dialog box to set prices if the user selected the Price by zone option during plan creation. If the user enabled this setting, then the Allow promoted price to vary by Prize Zones setting has a check mark beside it in the Optimization/Evaluation section.

To enter promotional prices manually across price zones, the user completes the following steps:
1. Select the products that the user wants to set prices for in the Product Assignments list.
   Note: If a product has been previously assigned to a vehicle that does not have the price by zone setting enabled, then that product is not eligible for pricing by zone.
2. From the Menu drop-down list that is located in the top-right corner of the event plan window, select Price By Zone. The Set Price By Price Zone dialog box appears, such as the dialog box 2200 depicted in FIG. 23.
3. Select the appropriate discount type from the Discount Type Across Zones drop-down list. This discount type is applied across all price zones for the selected products.
4. Enter a value in the Promotion column for each price zone. The resulting promoted price appears in the Promoted Price column.
5. Click OK to set the designated promotional prices. Click Cancel to cancel any price changes that the user has made. Click Help to view the online Help information.

To evaluate the effects of price changes, after the user enters price changes using the Set Price By Price Zone dialog box, the user then evaluates the effect of those price changes. To evaluate an event plan, the user selects Evaluate from the Menu drop-down list that is located in the top-right corner of the event plan window.

To review optimization or evaluation messages after optimization or evaluation is complete, the user looks in the Optimization/Evaluation section to review any messages that pertain to those calculations. In this section, the user sees the status of the optimization or evaluation, as well as any warnings or errors.

The user sees a warning message in this section after optimization or evaluation is complete if there are plan goals or targets that are not met. The user also sees a warning message in this area when the KPIs for a plan are out-of-date. This can occur after data has been updated or after a change has been made to an overlapping calendar vehicle or TPC.

If any errors occurred, the Messages tab comes into view automatically in the event plan window. All error messages are listed on this tab.

To Review the Performance of an Event Plan, after optimization or evaluation is complete, the user can review the expected performance of an event plan on the Plan Performance tab of the event plan window. The section at the top contains the Plan Performance table. If necessary, the user clicks the Plan Performance label to view this table. The contents of the Plan Performance table are described in the following table.

Note: Any negative values are displayed in parentheses.

| Column | Description |
| --- | --- |
| Metric Categories | Three categories are summarized for the metrics in the Plan Performance table:<br>Plan Expected is the estimate of expected plan performance for each metric.<br>Baseline Expected displays the estimate of sales if there was no change from the last regular price.<br>Change is the percentage change between the estimates for expected plan performance and expected baseline performance for each metric. |
| Revenue ($) | Estimate of revenue dollars |
| Margin ($) | A measure of sales productivity, calculated as follows:<br>margin ($) = total revenue − total cost |
| Margin (%) | A measure of sales productivity, calculated as follows:<br>margin (%) = (sales revenue − cost of goods sold)/sales revenue |
| Sales Units | The total number of units sold for products in a plan |

If the user is satisfied with the results of an event plan, the user can publish the event that contains the plan.

To change the status of an event vehicle after product assignment to event vehicles is complete, the user approves the assignments by changing the status of the vehicle.

Note: The user can change the status of an event vehicle when the key performance indexes (KPIs) for an event are up-to-date.

To change the status of an event vehicle, the user completes the following steps:
 1. Scroll to the event vehicle column in the Product assignments list of an event plan.
 2. Right-click the column heading, and then select Change Vehicle Status from the pop-up menu.
 3. In the resulting list, select Approved. A confirmation dialog box appears.
 4. Select Yes to confirm the status change. Select No to cancel the status change.

To change the status of a price promotion to implement an event plan, after promotional prices have been assigned to products in the Product assignments list, the user approves the price promotion so that those prices can be implemented. When the user approves a price promotion, the user selects the current event plan to become the only active plan. As a result, any overlapping event plans become inactive. The only action that the user can perform with an inactive plan is to delete it from the event window.

The user can have more than one active plan for an event. This is often the case when the user compares the effectiveness of one plan with others. However, price changes cannot be implemented until a price promotion has been approved and the remaining plans have become inactive. Note: When a plan becomes inactive, it cannot become active again. The user needs to unapprove a price promotion, and then create new alternative event plans if the user wants to perform more comparisons between event plans.

To change the status of a price promotion, the user completes the following steps:
 1. Scroll to the Promotion Amount column in the Product assignments list of an event plan.
 2. Right-click the column heading, and then select Change Vehicle Status from the pop-up menu.
 3. In the resulting list, select Approved. A confirmation dialog box appears.
 4. Select Yes to confirm the status change. Select No to cancel the status change.

The user can copy an event plan for an event. This saves time when the user wants to create a new event plan that is similar to an existing event plan. An example of a copy event plan dialog box is shown at 2300 in FIG. 24. Via this dialog box 2300 in order to copy an event plan from the list of event plans in the event window, the user completes the following steps:
 1. Highlight the row of the event plan that the user wants to copy.
 2. Select Copy Plan from the Menu drop-down list that is located in the top-right corner of the event window.
 3. In the dialog box, enter the appropriate values for the new plan.
 4. Click Save to save the new event plan. The plan appears in the list of event plans for the associated event. Click Cancel to cancel the copy request. Click Help to view the online Help information.

To copy an event plan from the event plan window, complete the following steps:
 1. Select Copy Plan from the Menu drop-down list that is located in the top-right corner of the event plan window.
 2. In the dialog box, enter the appropriate values for the new plan.
 3. Click Save to save the new event plan. The plan appears in the list of event plans for the associated event. Click Cancel to cancel the copy request. Click Help to view the online Help information.

To delete a plan from the list of event plans in an event window, the user completes the following steps:
 1. Highlight the event plan that the user wants to delete by clicking the event plan name.
 2. Click the interface item to delete the event plan.
 3. In the confirmation dialog box, click Yes to delete the plan. Click No to cancel the deletion request.

To delete a plan from the event plan window, the user completes the following steps:
 1. Select Delete Plan from the Menu drop-down list that is located in the top-right corner of the event plan window. A confirmation dialog box appears.
 2. Click Yes to delete the plan. Click No to cancel the deletion request.

Regarding vehicles, a vehicle is a tool, such as a radio commercial or newspaper insert, that is used to create awareness of promotions. A vehicle can stand alone (a calendar vehicle), or it can be associated with an event (an event vehicle). Typically, calendar vehicles are planned well in advance, often up to a year ahead. Event vehicles are planned as the user plans a promotional event.

Vehicles have a scope-a defined set of products and locations-associated with them. During system installation and configuration, the solution administrator implements the definitions for the vehicle types that are specific to the user's organization.

The user can perform the following tasks with vehicles:
create a vehicle
open a vehicle
modify vehicle details
modify the product assignments for a vehicle
modify the status of a vehicle
delete a vehicle The user can view the list of calendar vehicles for a calendar in the Vehicle List view of a calendar. The user can access the Vehicle List for a calendar by opening a calendar and selecting Vehicle List from the View drop-down list.

The columns that appear in this list are explained in the following table:

| Column | Description |
| --- | --- |
| Vehicle Name | The name of a calendar vehicle |
| Category | The category of a vehicle, such as a coupon or discount vehicle |
| Start Date | The date that a vehicle begins distribution |
| End Date | The date that a vehicle ends distribution |
| Impact Start Date | The date on which demand is expected to increase |
| Impact End Date | The date on which increased product demand is expected to end |

Figure 25:
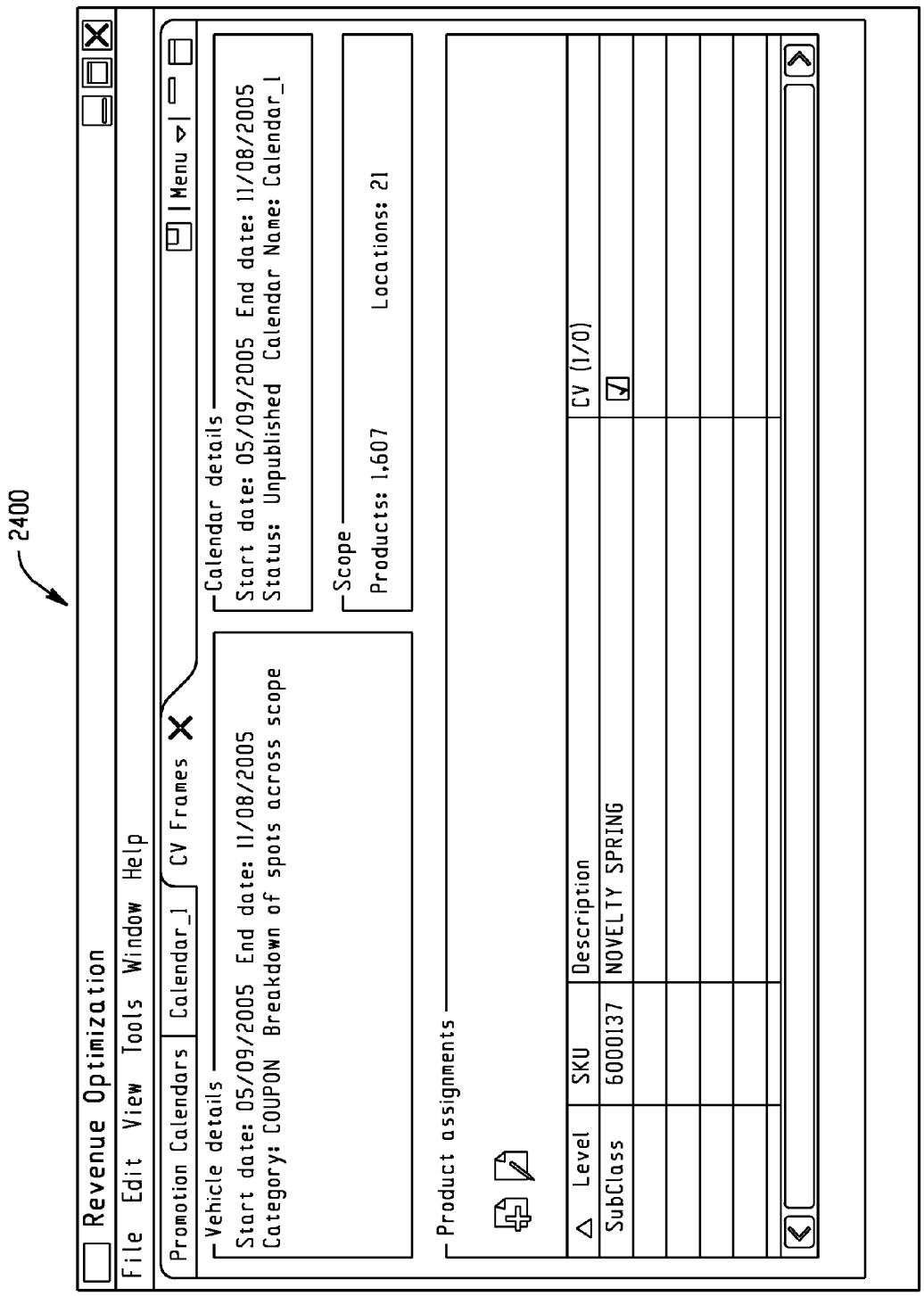

Regarding the calendar vehicle window, the user can control the details of a calendar vehicle from the calendar vehicle window. An example of a calendar vehicle window is shown at 2400 in FIG. 25. The Vehicle details section displays the start and end dates and the vehicle type for the calendar vehicle. The Vehicle Details label is a link that opens the Vehicle Details dialog box. The Breakdown of spots across scope link opens a dialog box with notes about the product distribution for the advertising spots for the vehicle.

The Calendar details section displays the start and end dates, the status, and the name of the calendar that contains the calendar vehicle.

The Scope section displays a count of the total number of products and the total number of locations that are available to the calendar vehicle. The Scope label is a link to the Scope Definition dialog box.

The Product assignments section displays the products that are assigned to a calendar vehicle. Each row in this section represents either a single product or a group of products from the product hierarchy. The user controls the products that are assigned to a calendar vehicle in the Product assignments section.

Regarding the Event Vehicle List, the user can view the list of support vehicles for an event in an event window. The user can access an event window by opening an event from the calendar chart view or from the Event List view.

The columns that appear in the event vehicle list are explained in the following table:

| Column | Description |
| --- | --- |
| Vehicle Name | The name of a calendar vehicle |
| Category | The category of a vehicle, such as a coupon or discount vehicle |
| Promotion Spots | The total number of spots that are associated with a vehicle |
| Due Date | The date on which all materials that are associated with a vehicle must be prepared |

Regarding vehicle categories and category attributes, the system can support a number of vehicle categories. These categories represent the various vehicles that might be used to support promotional events or to promote a set of products. The default vehicle categories that are available in the system are listed here:
BOGO (Buy One, Get One)
Coupon
Discount
X for Price The vehicle category descriptions that are discussed here are based on the default categories that come with a promotion optimization system. Some details, such as the specific attributes for each category and even the list of vehicle categories, might vary depending on the configuration for the user's organization.

Each vehicle category has attributes that are specific to that category. The values that the user enters for these attributes, such as vehicle size or placement, are mapped to a level of support. For example, a half-page newspaper vehicle might map to a medium support level, and a full-page newspaper vehicle might map to a high support level. The information about the vehicle category and its support level is used to track the sales impact for similar vehicles. This information is then used to predict more accurately the expected retail impact of new vehicles.

The values that the user can enter for category-specific attributes are generally specific to the user's organization.

Regarding BOGO vehicles, a user uses a BOGO (Buy One, Get One) vehicle to give a promotional price on a product when the customer purchases one or more of the same product. For example, a grocer might allow a customer to buy one can of soup and receive a second can of the same soup at half price.

In addition, when defining a BOGO vehicle, the user can specify that the customer must purchase more than one of an item in order to receive a promotional price for an additional item. For example, a clothing retailer might advertise a special where the customer receives a free shirt with the purchase of two shirts in the same line.

BOGO vehicles have these specific attributes:
circulation
distribution method
effective discount-the percentage discount per item, multiplied by the percentage of customers who are expected to take advantage of the BOGO offer. This measure is used to calculate revenue. For example, for a Buy One, Get One free offer, the discount percentage per item is 50 percent when two products are purchased. The effective discount is 50 percent times the proportion of customers who are predicted to take advantage of the BOGO offer.
Valid entries range from 0 to 100; the default value is 0.
number distributed
number of stores Regarding a coupon vehicle, a coupon vehicle is an advertisement that has an accompanying coupon. Customers receive a promotional price when they provide their coupon during a purchase.

A coupon vehicle has these specific attributes:
circulation
distribution method
effective discount-the percentage discount in a coupon multiplied by the percentage of customers who are expected to use that coupon. This measure is used to calculate revenue.
Valid entries range from 0 to 100; the default value is 0.
number distributed
number of stores Regarding a discount vehicle, a user uses a discount vehicle to apply a discount to the current price of all products that are assigned to it. If a product is already designated as part of a price reduction, then the price for that product is further discounted by the amount that is indicated in the discount vehicle. That is, any other discount is applied to a product first and then discounted by the percentage in the discount vehicle.

Discount vehicles have one specific attribute: the size of the discount percentage. All products that are assigned to a discount vehicle receive the same percentage discount from the current price.

Regarding an X for Price vehicle, an X for Price vehicle is similar to a BOGO vehicle because customers receive discounts when they purchase more than one unit of a product. With an X for Price vehicle, customers receive a promotional price when they purchase a specific quantity of an item. For example, as part of a promotion, the user might offer a price of $9.00 for two items that normally cost $5.00 individually. There are no default attributes that are associated with an X for Price vehicle.

A calendar vehicle is a stand-alone vehicle that is planned well in advance of execution. Calendar vehicles are not associated with an event. An event vehicle is created to support a promotional event. The purpose of calendar vehicles and event vehicles is to increase demand for the products that they feature.

To create a new vehicle, a user completes the following steps:

1. Depending on the type of vehicle that the user wants to create, perform one of the following actions:

To create a calendar vehicle, select New Calendar Vehicle from the Menu drop-down list that is located in the top-right corner of the calendar window.

To create an event vehicle, open an event and select New Vehicle from the Menu drop-down list that is located in the top-right corner of the event window.

The Select Vehicle Category dialog box appears.

2. Specify the vehicle category in the Select Vehicle Category dialog box. Click OK. The New Vehicle dialog box appears, such as the dialog box depicted at 2500 in FIG. 26.

3. Specify details about the vehicle in the New Vehicle dialog box.

(a) Enter a name for the vehicle in the Name box.

(b) Enter a start date for the vehicle. The start date is before the end date for an associated calendar or event. The default is the start date for the associated calendar or event.

Note: If it is allowed for the vehicle type that the user has selected, the start date for an event vehicle can occur before the start date of an associated event. For example, a television advertisement typically begins before the start date of a sale that it promotes.

(c) Enter an end date for the vehicle. This date occurs after the vehicle start date and on or before the end date for the associated calendar or event. The default is the end date for the associated calendar or event.

(d) Enter the due date for the vehicle. This is the date when vehicle production is complete and the vehicle is ready for distribution. The default due date is one day before the start date for a vehicle. A solution administrator sets this value.

(e) Review the impact start and end dates for the vehicle. The impact start and end dates are the dates for which a vehicle is intended to increase demand.

(f) If it is required for the vehicle category that the user is creating, enter the number of advertising spots for this vehicle. This is the maximum number of products or product categories that can be assigned to a vehicle, across all merchants who have access to the vehicle.

4. Click the Scope link to refine the scope of a vehicle by using the Scope Definition dialog box. The scope of a vehicle is the set of products and locations that are available for inclusion in a vehicle.

5. To indicate that a price promotion is required for this vehicle, select Price promotion required.

6. If the user has indicated that a price promotion is required, the user can also indicate that products should be priced by price zone. To enable variable pricing across price zones, select Price By Zone. This means that a product has the same price at all locations in a price zone and that prices can vary between price zones.

7. Enter information about the breakdown of spots in the Breakdown of spots across scope box. Typically, a marketing planner uses this box to indicate how many spots should be allocated across all the categories of products that are included in a vehicle.

8. Enter information about any category-specific attributes for the vehicle. The attributes that are listed in the New Vehicle dialog box depend on the category of vehicle that the user is creating. A solution administrator configures attributes that are associated with each vehicle category during the system's configuration.

9. Click Save to create the vehicle. Alternatively, click Cancel to cancel creation of the vehicle. Click Help to view this information.

To open a vehicle, a user completes the following steps to open a calendar vehicle:

1. In any view of a calendar window, select Open Calendar Vehicle from the Menu drop-down list that is located in the top-right corner of the calendar window. The Open Calendar Vehicle dialog box appears.

2. Select the vehicle from the list.

3. Click OK to open the calendar vehicle window. Click Cancel to close the dialog box without opening a calendar vehicle.

For an event vehicle, there is no vehicle window to open. To access details about an event vehicle, the user accesses the Vehicle Details dialog box.

The user can modify the following details about a calendar vehicle or an event vehicle in the Vehicle Details dialog box:

name start and end dates due date number of spots to run, if this is appropriate for the vehicle category vehicle scope pricing requirements category-specific vehicle attributes The user opens the Vehicle Details dialog box for a calendar vehicle by clicking the Vehicle details link in an open calendar vehicle window. Alternatively, the user can select Calendar Vehicle Details from the Menu drop-down list that is located in the top-right corner of the calendar vehicle window.

The user opens the Vehicle Details dialog box for an event vehicle from an open event window by completing the following steps:

1. If necessary, expand the Event Vehicle section by clicking the Event Vehicles label, and then select the event vehicle that the user wants to modify.

2. Select Vehicle Details from the Menu drop-down list that is located in the top-right corner of the event window. The Vehicle Details dialog box appears.

To use the vehicle details dialog box, the user can modify the details of a vehicle by using the Vehicle Details dialog box, such as the dialog box depicted at 2600 in FIG. 27. Via the dialog box 2600 in order to modify the details of a vehicle, the user completes the following steps:
1. Modify details about the vehicle:
   (a) Edit the name for the vehicle in the Name box.
   (b) Edit the start date for the vehicle. The start date is before the end date for an associated calendar or event. The default is the start date for the associated calendar or event.
      Note: If it is allowed for the vehicle type that the user has selected, the start date for an event vehicle can occur before the start date of an associated event. For example, a television advertisement typically begins before the start date of a sale that it promotes.
   (c) Edit the end date for the vehicle. This date occurs after the vehicle start date and on or before the end date for the associated calendar or event. The default is the end date for the associated calendar or event.
   (d) Edit the due date for the vehicle. This is the date when vehicle production is complete and the vehicle is ready for distribution. The default due date is one day before the start date for a vehicle. This value is set by a solution administrator.
   (e) Review the impact start and end dates for the vehicle. The impact start and end dates are the dates for which a vehicle is intended to increase demand.
   (f) Edit the number of spots for the vehicle. This is the maximum number of products or product categories that can be assigned to a vehicle.
2. Click the Scope link to refine the scope of a vehicle by using the Scope Definition dialog box. The scope of a vehicle is the set of products and locations that are available for inclusion in a vehicle.
3. For an event vehicle, the user can indicate that a price promotion is required by selecting Price promotion required.
4. If the user indicates that a price promotion is required for an event vehicle, the user can also indicate that products should be priced by price zone. To enable variable pricing across price zones, select Price By Zone. This means that a product has the same price at all locations in a price zone and that prices can vary between price zones.
5. Edit notes about the distribution of spots across the vehicle scope in the Breakdown of spots across scope box.
6. Edit information about any category-specific attributes for the vehicle. The attributes that are listed in the Vehicle Details dialog box depend on the category of vehicle that the user is creating.
7. Click Save to save changes to the vehicle. Click Cancel to cancel the user's changes.

To modify the product assignments for a vehicle, when the user creates a vehicle, the user defines the scope of that vehicle. This is the list of products and locations that are available to a vehicle. Before a vehicle can be implemented, the user assigns specific products to that vehicle. The products that the user assigns are selected from the vehicle's scope. The number of products or product categories that the user assigns to a vehicle cannot exceed the number of spots that are designated for a vehicle. This value does not apply to all vehicle types. For example, BOGO and coupon vehicles do not have a limit on the number of spots that can be assigned to them.

To Assign Products to a Calendar Vehicle, for a calendar vehicle, the user sets product assignments in the Product assignments section of the calendar vehicle window. Each row in this section represents either a single product or product category from the product hierarchy. Calendar vehicles automatically apply to all locations of the products that are assigned to them. To modify the product assignments for a calendar vehicle, the user completes the following steps:
1. If necessary, open the calendar vehicle window from the appropriate calendar window.
   (a) Select Open Calendar Vehicle from the Menu drop-down list that is located in the top-right corner of the calendar window.
   (b) In the Open Calendar Vehicle dialog box, select the name of the calendar vehicle that the user wants to open.
   (c) Click OK to open the calendar vehicle window.
2. Set the product assignments for a calendar vehicle in the Product assignments section. By including a product or product category in this section, the user automatically assigns that product or product category to the calendar vehicle.
   To add products to the list of assigned products, complete the following steps:
      (a) Click the interface item to open the Assign Products dialog box.
      (b) Select the products that the user wants to assign to the calendar vehicle using this dialog box.
   To delete products from the list of assigned products for a calendar vehicle, the user completes the following steps:
      (a) Select the products that the user wants to delete from the calendar vehicle.
      (b) Click the interface item above the Product assignments list.
      (c) In the confirmation dialog box, click OK to delete the product(s) from the list of assigned products. Click Cancel to cancel the deletion request.
3. Save the calendar vehicle by clicking the interface item in the top-right corner of the calendar vehicle window.

For an event vehicle, the user controls product assignments in the Product assignments section of an event plan window. The user creates an event vehicle before products can be assigned to it from an event plan. There are several ways that products can be assigned to an event vehicle:
   The user can optimize an event plan and approve vehicle assignments. During optimization, the system adds products to the list of assigned products for an event plan and indicates the products that should be assigned to an event vehicle. The user reviews the selections, make any modifications, and approve the event vehicle.
   The user can assign products or product categories to an event vehicle manually. Event vehicle assignments are made in the list of assigned products for an event plan.
      Note: The user can modify the list of products and product categories that appear in the Product assignments section for an event plan.

To modify the product assignments for an event vehicle, the user completes the following steps:
1. Open an event plan window by double-clicking the appropriate plan row from the plan list in the event window.
2. Set the product assignments for an event vehicle in the Product assignments section for an event plan.
   To add products to the list of assigned products, complete the following steps:
      (a) Scroll to view the column for a vehicle in the Product assignments list.
      (b) To add a single product, click the check box in the vehicle column to assign a product to that vehicle. A checkmark appears in the box for the vehicle.

(c) To assign all products in the list to a vehicle, right-click the heading for the vehicle column. Then select Selection of Products→Include All Products. A checkmark appears in all the check boxes in the vehicle column.

(d) To assign all products that were selected during optimization of an event plan, right-click the heading for the vehicle column. Then select Selection of Products→Include All Optimized.

To delete a product from the list of assigned products for an event vehicle, the vehicle must be in unapproved status. To delete products, the user completes the following steps:

(a) Scroll to view the column for a vehicle in the Product assignments list. A checkmark appears for all products that are assigned to a vehicle.

(b) To delete a single product from the list of assigned products, right-click the check box and select Exclude Vehicle. A red "x" appears in the check box to indicate that a product has been deleted from a vehicle.

(c) To delete all products from the list of assigned products, right-click the column heading for the vehicle column. Then select Selection of Products→Exclude All Products.

(d) To delete all products that were selected during optimization of an event plan, right-click the heading for the vehicle column. Then select Selection of Products→Exclude All Optimized.

3. Save the event plan by clicking the interface item in the top-right corner of the event plan window.

Figure 28:
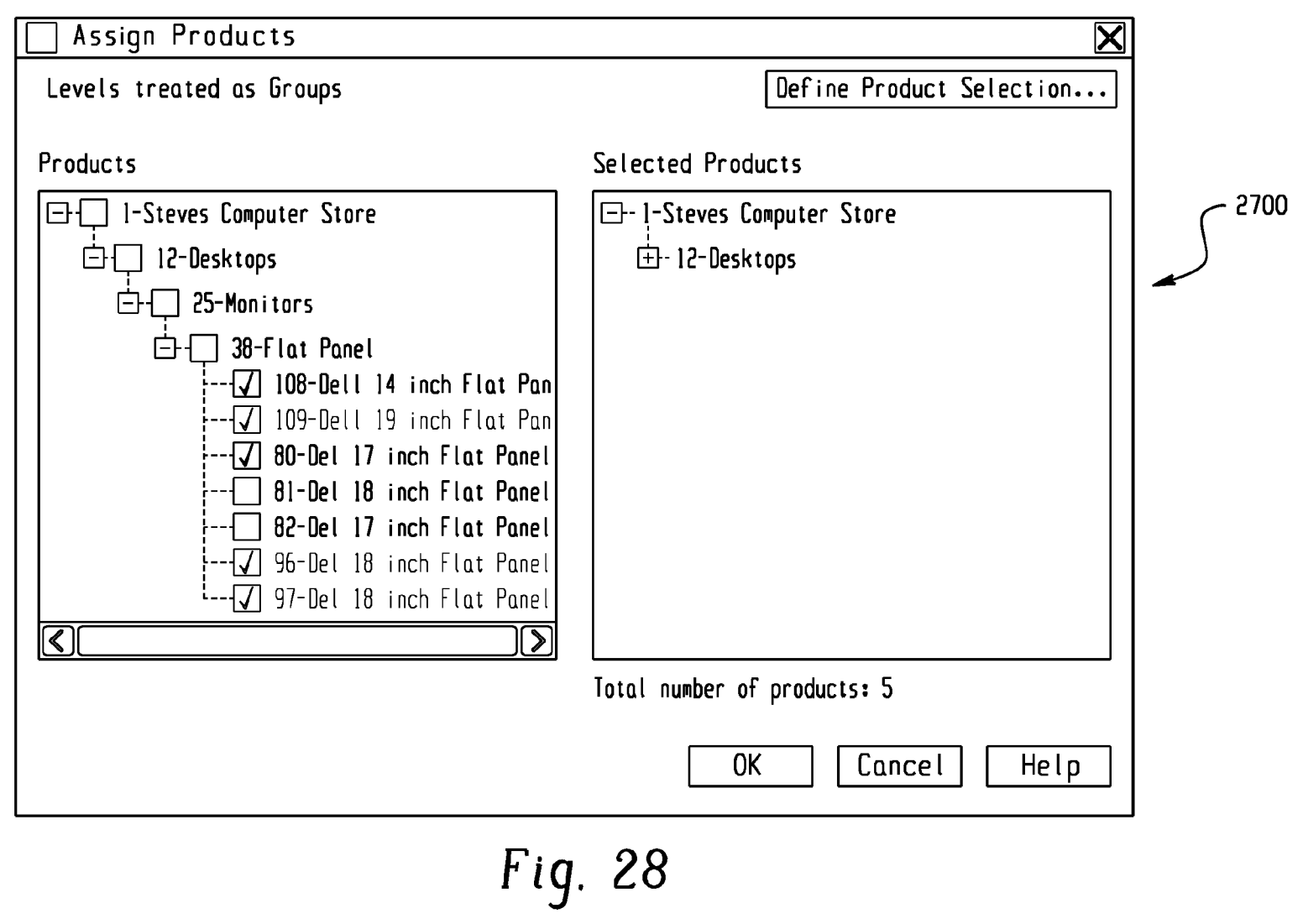

The user accesses the Assign Products dialog box to add products or product categories to the Product assignments section of a calendar vehicle or an event plan window. The user can access the Assign Products dialog box by clicking the interface item in the Product assignments section. An example of such a dialog box shown at 2700 in FIG. 28. To assign products using the Assign Products dialog box 2700, the user completes the following steps:

1. Select the products that the user wants to assign from the product hierarchy in the Products box. Only products that are in the scope of the associated event plan or calendar are available for selection. As the user selects products, they appear in the hierarchy in the Selected Products box. The total number of selected products is displayed below the Selected Products box.

2. Alternatively, click Define Product Selection to select products by using the Define Product Selection dialog box.

3. Click OK to complete the user's selection and close the dialog box. Click Cancel to cancel the user's selections. Click Help to view online Help.

The status of an event vehicle appears in the Event Plans list of an event window. The user scrolls over to the column that displays the name of a vehicle to see the status of that vehicle. The status of a vehicle is updated nightly. Note: Only event vehicles have a status that is associated with them. An event vehicle can have the following status values:

| Status | Meaning |
| --- | --- |
| Unapproved | Settings for a vehicle have not been approved.<br>The user can change the status to Approved from this state. |
| Approved | Current settings have been approved.<br>The user can change the status to Unapproved from this state. |
| Submitted to Execution | Price changes have been entered into the price execution system.<br>The user cannot change the status when a vehicle reaches this state. |
| Executing | The vehicle is currently active.<br>The user cannot change the status when a vehicle reaches this state. |
| Executed | The vehicle has completed execution.<br>The user cannot change the status when a vehicle reaches this state. |

The user can change the status of an event vehicle from the Product assignments section of an event plan window. The user completes the following steps to change the status of an event vehicle:

1. Open the event plan window from the list of event plans in an event window.
2. In the Product assignments list, scroll to the right to view the column for a vehicle.
3. Right-click the heading for the vehicle.
4. To approve a vehicle, select Change Vehicle Status→Approved. To unapprove a vehicle, select Change Vehicle Status→Unapproved.

Note: To approve a vehicle, the event plan must be successfully optimized or evaluated.

The user can delete a calendar vehicle from the calendar vehicle window or from a calendar window. To delete a calendar vehicle from the calendar vehicle window, the user completes the following steps:

1. Select Delete Calendar Vehicle from the Menu drop-down list that is located in the top-right corner of the calendar vehicle window. A confirmation box appears.
2. Click OK to delete the vehicle. Click Cancel to cancel the deletion request.

To delete a calendar vehicle from the Chart view or the Vehicle List view of a calendar, the user completes the following steps:

1. Select Delete Calendar Vehicle from the Menu drop-down list that is located in the top-right corner of the calendar window. The Delete Calendar Vehicle(s) dialog box appears.
2. Select the name of the vehicle(s) that the user wants to delete.
3. Click Delete. Click Cancel to cancel the request.

The user can delete an event vehicle from the event window by completing the following steps:

1. Select the vehicle from the Event Vehicles list.
2. Select Delete Vehicle from the Menu drop-down list that is located in the top-right corner of the event window. A confirmation dialog box appears.
3. Click Yes to delete the vehicle. Click No to cancel the deletion request.

Figure 29:
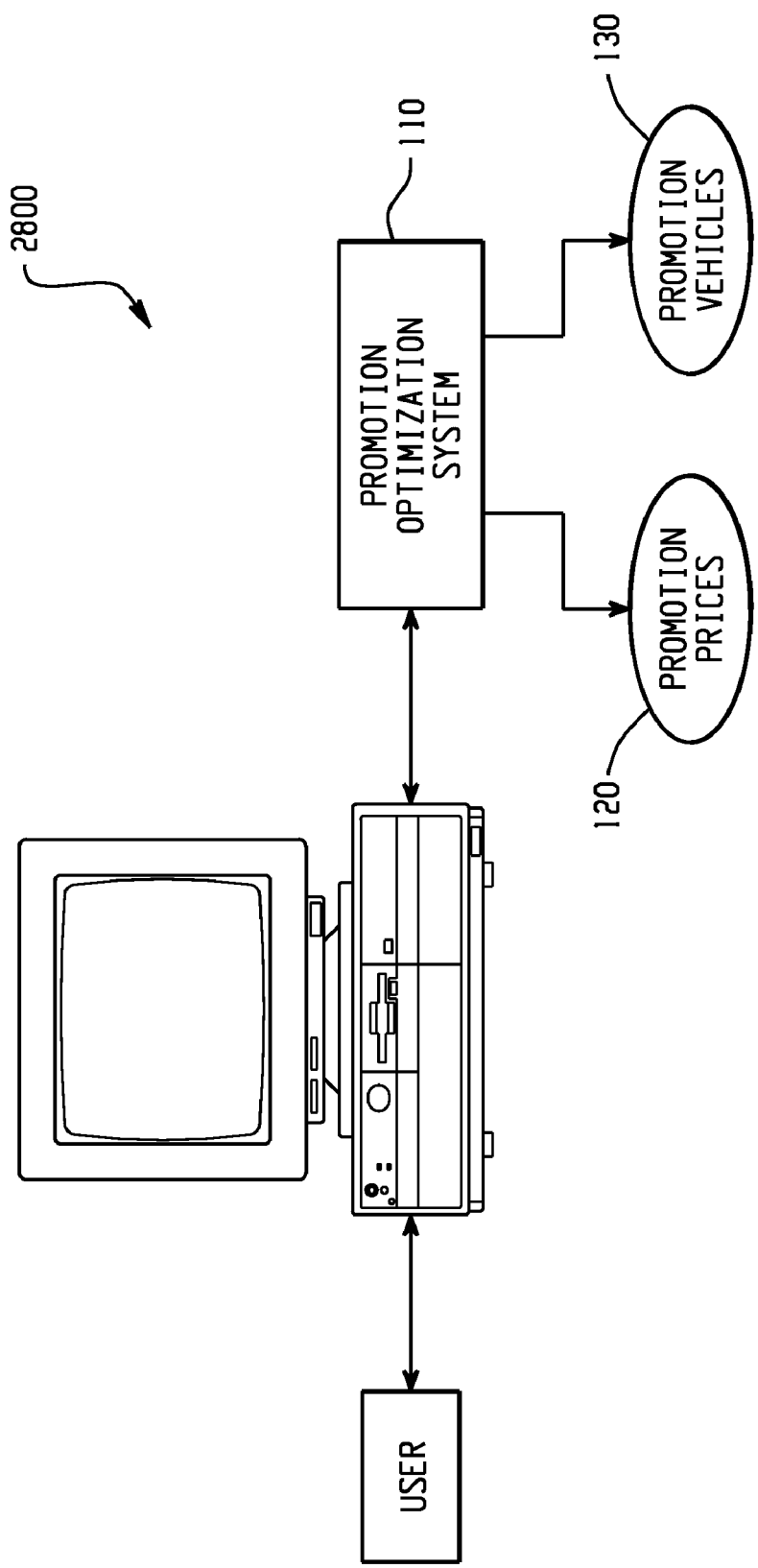
FIG. 29 is a block diagram depicting a single general purpose computer environment wherein a user can interact with a price promotion optimization system.

As additional example of the wide scope of the systems and methods disclosed herein, it is further noted that the systems and methods may be implemented on various types of computer architectures, such as for example on a single general purpose computer or workstation (as shown at 2800 on FIG. 29), or on a networked system, or in a client-server configuration, or in an application service provider configuration.

It is further noted that the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for determining promotion prices for a plurality of items, comprising:

receiving, using one or more data processors, price data corresponding to a plurality of items;

receiving, using the one or more data processors, price vehicle data corresponding to a promotion event, wherein the price vehicle data identifies allowable discounts for each item in the plurality of items, and wherein the price data and the price vehicle data form a champion configuration;

receiving, using the one or more data processors, promotion vehicle data corresponding to the promotion event, wherein a promotion vehicle includes one or more promotion vehicle slots that display an item and the price for the item;

determining, using the one or more data processors, a champion metric value of a champion metric for the champion configuration based upon the price data, wherein the champion metric value is calculated using cross effects of prices among different items, wherein the champion metric corresponds to a target business objective;

adjusting, using the one or more data processors, the price data for a particular item according to the allowable discounts for that item identified by the received price vehicle data, wherein the adjusted price data is used to calculate a cross effect on demand for the different items;

adjusting, using the one or more data processors, the promotion vehicle data corresponding to the promotion event, wherein the adjusted promotion vehicle data is used to calculate a cross effect of demand for the different items, and wherein the adjusted price data and adjusted promotion vehicle data form a revised champion configuration;

using one or more nonlinear demand models to calculate a revised value for the champion metric for the revised champion configuration, wherein the revised value is calculated based upon the calculated cross effects of the adjusted price data and adjusted promotion vehicle data, and wherein when the revised value is more optimal than the champion metric value with respect to the target business objective, the revised value and the revised champion configuration are retained; and determining, using the one or more data processors, a final champion configuration by repeatedly adjusting the price data and the promotion vehicle data for the particular item using a local searching operation and the one or more nonlinear demand models, wherein the local searching operation incrementally adjusts the price data and the promotion vehicle data for the particular item, and wherein the nonlinear demand model repeatedly calculates a revised value that is compared to the champion metric value to determine the final champion configuration.

2. The method of claim 1, wherein the price data adjustments and the promotion vehicle data adjustments conform to one or more constraints.

3. The method of claim 2, wherein the one or more constraints are expressed as equalities or inequalities.

4. The method of claim 2, wherein the one or more constraints are a promotion vehicle capacity, a product grouping constraint, an absolute margin constraint, a percent margin constraint, or a uniform price across locations constraint.

5. The method of claim 1, wherein the final champion configuration maximizes the champion metric.

6. The method of claim 1, wherein champion configurations are determined for more than 1,000 item-locations.

7. The method of claim 1, wherein the price data and promotional vehicle data adjustments are repeated until the champion metric meets the target business objective.

8. The method of claim 7, wherein the target business objective is a total revenue objective.

9. The method of claim 7, wherein the target business objective is total demand objective across the plurality of items.

10. The method of claim 1, wherein the plurality of items includes goods or products available at a store.

11. The method of claim 10, wherein the plurality of items are located at multiple stores.

12. The method of claim 1, wherein one or more servers or upon a single general purpose computer process the one or more nonlinear demand models.

13. The method of claim 1, wherein the promotion vehicle is a newspaper circular, a promotion flyer, a buy-one-get-one vehicle, or an end-of-aisle display.

14. The method of claim 1, wherein tens of thousands of promotion prices are determined for the plurality of items at thousands of locations or stores.

15. The method of claim 1, wherein the final champion configuration is provided as output to a user or to another computer program.

16. The method of claim 1, wherein branching instructions prevent analysis of one or more data combinations corresponding to the particular item, wherein data combinations include price data-promotion vehicle data combinations, and wherein analysis is prevented based upon the calculated revised values.

17. The method of claim 1, wherein the promotion vehicle data is incrementally adjusted by the local searching operation, wherein incrementally adjusting includes the particular item to a promotion vehicle slot or using the particular item to replace another item in the promotion vehicle slot.

18. A computer-implemented system for determining promotion prices for a plurality of items, comprising:
- one or more data processors;
- one or more computer-readable storage mediums containing instructions configured to cause the one or more processors to perform operations including:
  - receiving price data corresponding to a plurality of items;
  - receiving price vehicle data corresponding to a promotion event, wherein the price vehicle data identifies allowable discounts for each item in the plurality of items, and wherein the price data and the price vehicle data form a champion configuration;
  - receiving promotion vehicle data corresponding to the promotion event, wherein a promotion vehicle includes one or more promotion vehicle slots that display an item and the price for the item;
  - determining a champion metric value of a champion metric for the champion configuration based upon the price data, wherein the champion metric value is calculated using cross effects of prices among different items, wherein the champion metric corresponds to a target business objective;
  - adjusting the price data for a particular item according to the allowable discounts for that item identified by the received price vehicle data, wherein the adjusted price data is used to calculate a cross effect on demand for the different items;
  - adjusting the promotion vehicle data corresponding to the promotion event, wherein the adjusted promotion vehicle data is used to calculate a cross effect of demand for the different items, and wherein the adjusted price data and adjusted promotion vehicle data form a revised champion configuration;
  - using one or more nonlinear demand models to calculate a revised value for the champion metric for the revised champion configuration, wherein the revised value is calculated based upon the calculated cross effects of the adjusted price data and adjusted promotion vehicle data, and wherein when the revised value is more optimal than the champion metric value with respect to the target business objective, the revised value and the revised champion configuration are retained; and
  - determining a final champion configuration by repeatedly adjusting the price data and the promotion vehicle data for the particular item using a local searching operation and the one or more nonlinear demand models, wherein the local searching operation incrementally adjusts the price data and the promotion vehicle data for the particular item, and wherein the nonlinear demand model repeatedly calculates a revised value that is compared to the champion metric value to determine the final champion configuration.

19. A computer-program product for determining promotion prices for a plurality of items, tangibly embodied in a machine-readable storage medium, including instructions configured to cause a data processing apparatus to:
- receive price data corresponding to a plurality of items;
- receive price vehicle data corresponding to a promotion event, wherein the price vehicle data identifies allowable discounts for each item in the plurality of items, and wherein the price data and the price vehicle data form a champion configuration;
- receive promotion vehicle data corresponding to the promotion event, wherein a promotion vehicle includes one or more promotion vehicle slots that display an item and the price for the item;
- determine a champion metric value of a champion metric for the champion configuration based upon the price data, wherein the champion metric value is calculated using cross effects of prices among different items, wherein the champion metric corresponds to a target business objective;
- adjust the price data for a particular item according to the allowable discounts for that item identified by the received price vehicle data, wherein the adjusted price data is used to calculate a cross effect on demand for the different items;
- adjust the promotion vehicle data corresponding to the promotion event, wherein the adjusted promotion vehicle data is used to calculate a cross effect of demand for the different items, and wherein the adjusted price data and adjusted promotion vehicle data form a revised champion configuration;
- use one or more nonlinear demand models to calculate a revised value for the champion metric for the revised champion configuration, wherein the revised value is calculated based upon the calculated cross effects of the adjusted price data and adjusted promotion vehicle data, and wherein when the revised value is more optimal than the champion metric value with respect to the target business objective, the revised value and the revised champion configuration are retained; and
- determine a final champion configuration by repeatedly adjusting the price data and the promotion vehicle data for the particular item using a local searching operation and the one or more nonlinear demand models, wherein the local searching operation incrementally adjusts the price data and the promotion vehicle data for the particular item, and wherein the nonlinear demand model repeatedly calculates a revised value that is compared to the champion metric value to determine the final champion configuration.

* * * * *